(12) United States Patent
Shams

(10) Patent No.: US 12,665,290 B2
(45) Date of Patent: Jun. 23, 2026

(54) TWO-DIMENSIONAL RADAR FOR MILLIMETER WAVE APPLICATIONS

(71) Applicant: BDCM A2 LLC, Dover, DE (US)

(72) Inventor: Soren Shams, Carlsbad, CA (US)

(73) Assignee: BDCM A2 LLC, Dover, DE (US)

( * ) Notice: Subject to any disclaimer, the term of this patent is extended or adjusted under 35 U.S.C. 154(b) by 722 days.

(21) Appl. No.: 17/775,747

(22) PCT Filed: Nov. 10, 2020

(86) PCT No.: PCT/US2020/059888
§ 371 (c)(1),
(2) Date: May 10, 2022

(87) PCT Pub. No.: WO2021/096889
PCT Pub. Date: May 20, 2021

(65) Prior Publication Data
US 2022/0393341 A1 Dec. 8, 2022

Related U.S. Application Data

(60) Provisional application No. 62/933,792, filed on Nov. 11, 2019.

(51) Int. Cl.
*H01Q 1/32* (2006.01)
*G01S 13/02* (2006.01)
*G01S 13/931* (2020.01)

(52) U.S. Cl.
CPC ......... *H01Q 1/3233* (2013.01); *G01S 13/931* (2013.01); *G01S 2013/0245* (2013.01)

(58) Field of Classification Search
CPC ................... H01Q 1/3233; H01Q 1/44; G01S 2013/0245; G01S 2013/93271;
(Continued)

(56) References Cited

U.S. PATENT DOCUMENTS 3,714,651 A * 1/1973 Lyon .................... G01S 13/933
342/29
10,088,564 B2 10/2018 Longstaff et al.
(Continued)

FOREIGN PATENT DOCUMENTS

GB 1590019 A * 5/1981 ........... G08B 13/184
JP 2015-132474 A 7/2015

OTHER PUBLICATIONS

IEEE 100: The Authoritative Dictionary of IEEE Standards Terms, Seventh Edition, IEEE Press, p. 1198 (Year: 2000).*
(Continued)

*Primary Examiner* — Robert W Hodge
*Assistant Examiner* — Fred H Mull
(74) *Attorney, Agent, or Firm* — Dinsmore & Shohl LLP

(57) ABSTRACT

Examples disclosed herein relate to two-dimensional radar for use in millimeter wave applications. An antenna structure of the two-dimensional radar includes a transmit array arranged along a first axis and configured to scan a field of view along the first axis at a first scan rate with radio frequency (RF) beams in a first polarization, and a receive array arranged along a second axis orthogonal to the first axis and configured to receive return RF beams in the first polarization to scan the field of view along the second axis at a second scan rate different from the first scan rate. Other examples disclosed herein relate to an antenna system for two-dimensional radar in millimeter wave applications and a radar system with two-dimensional scanning.

18 Claims, 12 Drawing Sheets

(58) Field of Classification Search

CPC . G01S 2013/93272; G01S 2013/93273; G01S 13/931; G01S 7/025

See application file for complete search history.

(56) References Cited

U.S. PATENT DOCUMENTS

| | | | |
|---|---|---|---|
| 2005/0007286 A1 | 1/2005 | Trott et al. | |
| 2006/0114164 A1 | 6/2006 | Iluz et al. | |
| 2007/0063889 A1* | 3/2007 | Hulbert | G01S 13/426 |
| | | | 342/134 |
| 2013/0050022 A1 | 2/2013 | Feger et al. | |
| 2014/0066757 A1* | 3/2014 | Chayat | G01S 13/89 |
| | | | 343/893 |
| 2017/0374500 A1 | 12/2017 | Guy et al. | |
| 2018/0149736 A1* | 5/2018 | Alland | G01S 7/032 |
| 2018/0345343 A1 | 12/2018 | Chen et al. | |

OTHER PUBLICATIONS

Controller. (2016). In Editors of the American Heritage Dictionaries (Ed.), The American Heritage Dictionary of the English Language (6th ed.). Houghton Mifflin. Credo Reference: https://search.credoreference.com/content/entry/hmdictenglang/controller/0 (Year: 2016).*

Farsaei et al. "Improved Two-Dimensional Millimeter-Wave Imaging for Concealed Weapon Detection Through Partial Fourier Sampling," ProQuest, Nov. 18, 2015, retrieved on [Jan. 13, 2021]. Retrieved from the internet <URL: https://search.proquest.com/docview/2259775308?pg-origsite=gscholar&fromopenview=true> entire documents.

Japanese Office Action regarding Notice of Reasons for Refusal from the Japan Patent Office (JPO) (8 pages).

* cited by examiner

Figure 2:
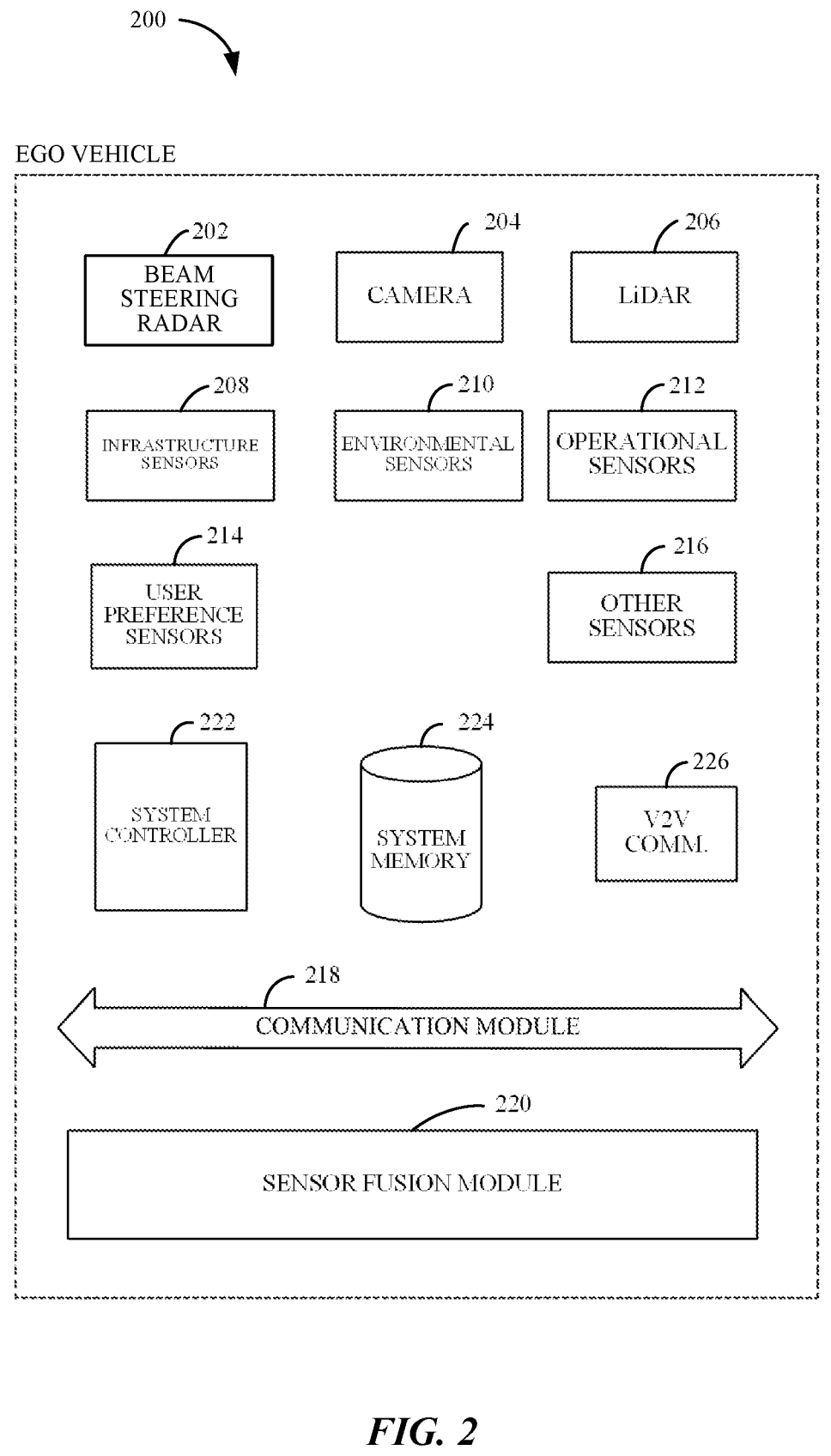

200

EGO VEHICLE

202
BEAM STEERING RADAR

204
CAMERA

206
LiDAR

208
INFRASTRUCTURE SENSORS

210
ENVIRONMENTAL SENSORS

212
OPERATIONAL SENSORS

214
USER PREFERENCE SENSORS

216
OTHER SENSORS

222
SYSTEM CONTROLLER

224
SYSTEM MEMORY

226
V2V COMM.

218
COMMUNICATION MODULE

220
SENSOR FUSION MODULE

LICENSE
PLATE
FRAME
410

LICENSE
PLATE
420

ANTENNA
430

HEAT SHIELD
440

TWO-DIMENSIONAL RADAR FOR MILLIMETER WAVE APPLICATIONS

CROSS-REFERENCE TO RELATED APPLICATIONS

This application is a U.S. national stage application under 35 U.S.C. § 371 of International Patent Application No. PCT/US2020/059888, filed on Nov. 10, 2020, which claims the benefit of U.S. Provisional Application No. 62/933,792 filed on Nov. 11, 2019, all of which are incorporated by reference in their entirety for all purposes.

BACKGROUND

In a wireless transmission system, such as radar or cellular communications, the size of the antenna is determined by the transmission characteristics. With the widespread application of wireless applications, the footprint and other parameters allocated for a given antenna, or radiating structure, may be constrained. In addition, the demands on the capabilities of the antenna continue to increase, such as increased bandwidth, finer control, increased range and so forth. In automated applications, such as self-driving vehicles, the radar and other sensors are expected to scan the environment of the vehicle with sufficient speed and responsiveness to enable rapid instructions to and from the vehicle within a short response time.

Phased array antennas form a radiation pattern by combining signals from a number of antenna elements and controlling the phase and amplitude of each element. The antenna or radiating elements are arranged in an array or sub-arrays and typically include patches in a patch antenna configuration, a dipole, or a magnetic loop, among others. The relative phase between each radiating element can be fixed or adjusted by employing phase shifters coupled to each element. The direction of the beam generated by the antenna is controlled by changing the phase of the individual elements.

BRIEF DESCRIPTION OF THE DRAWINGS

The present application may be fully appreciated in connection with the following detailed description taken in conjunction with the accompanying drawings, which are not drawn to scale and in which like reference characters refer to like parts throughout, and wherein:

FIG. 2 illustrates a schematic diagram of an autonomous driving system for an ego vehicle in accordance with various implementations of the subject technology;

DETAILED DESCRIPTION

Figure 1:
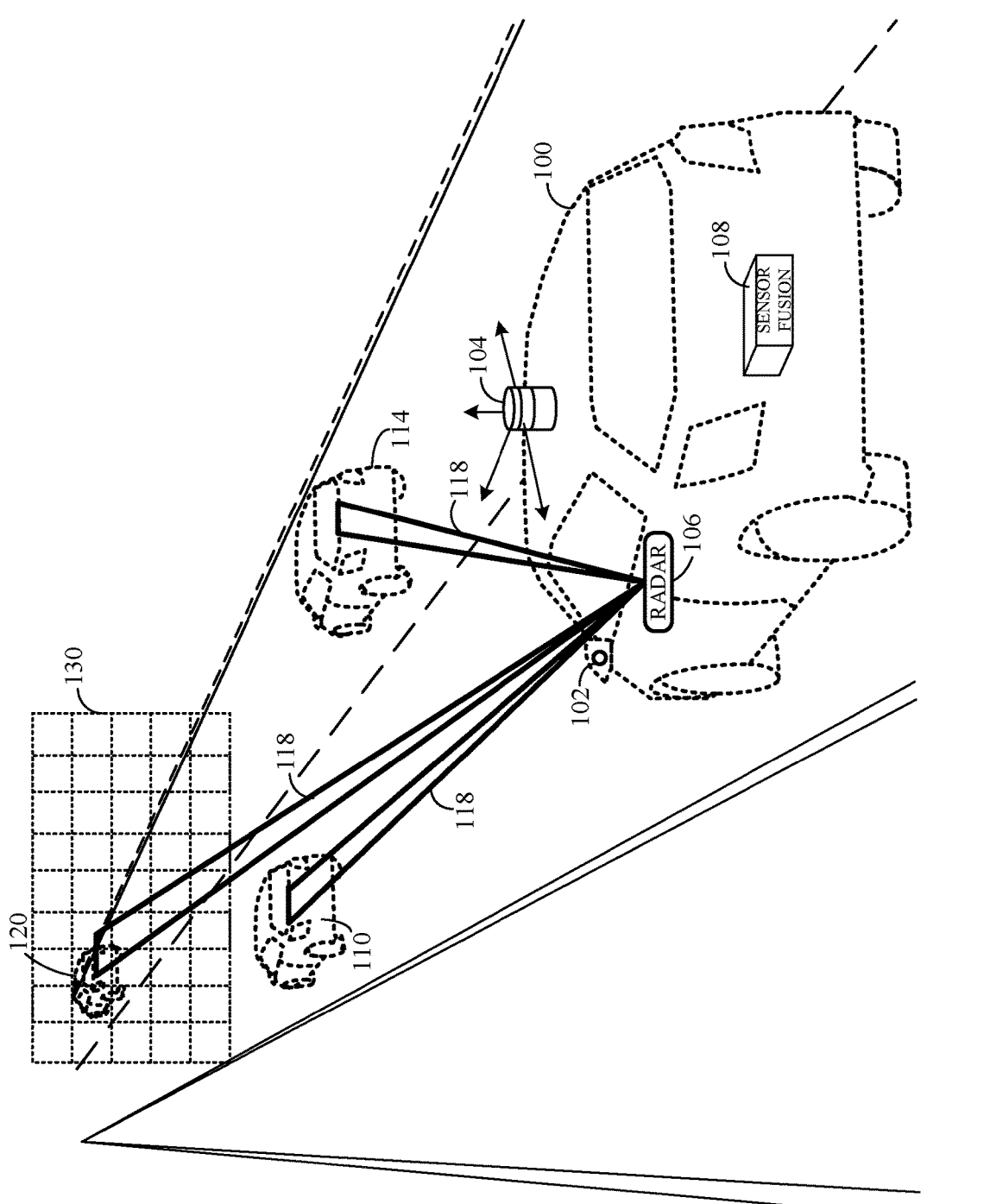
FIG. 1 illustrates an example environment in which a beam steering radar in an autonomous vehicle is used to detect and identify objects, according to various implementations of the subject technology.

Traditional two-dimensional (2D) phased array antennas offer pencil beams with scanning capabilities in both U and V planes. To achieve a specific beam width in the azimuth and elevation planes, antenna elements are formed in a grid with N and M elements in the azimuth and elevation directions for a total of N×M elements. Radar systems based on planar 2D arrays utilize an outgoing pencil beam for transmitter (TX) UN scanning to a target and an incoming pencil beam for receiver (RX) UN scanning from a target, which offers higher gain at the expense of much higher cost and complexity in terms of N×M Radio Frequency (RF) channels for each RX and TX antenna and translates into a total number of 2×N×M RF channels. In this respect, a symmetric beam width in elevation and azimuth planes (M=N) requires $2N^2$ RF channels. This number of RF channels needed for traditional 2D phased array antenna creates a challenging burden in terms of size, complexity and cost.

The present disclosure provides for a 2D radar for millimeter wave applications that significantly reduces the number of RF channels needed to provide 2D beam scanning and to meet beam width requirements. For example, the subject technology utilizes N and M RF channels for RX and TX antennas, respectively, to provide similar multiplied beam-width. This amounts to a total number of N+M RF channels (2N for symmetric azimuth and elevation beam widths), which is significantly fewer than that of traditional 2D phased array antennas. This results in significant savings in terms of cost and complexity. The TX beam scanning utilizes an outgoing fan beam for scanning one axis (e.g., U-axis) to a target at a first scan rate and the RX beam scanning utilizes an incoming fan beam for scanning the other axis (e.g., V-axis) from the target at a second scan rate, where the RX and TX fan beams are perpendicular. In this respect, fan beams offer significantly lower cost and more simplified system design with lower gain. In some instances, the Total Radiated Power (TRP) can be increased to an Effective Isotropic Radiated Power (EIRP) threshold to compensate for the lower gain.

In some implementations, an antenna structure of the two-dimensional radar includes a transmit array arranged along a first axis and configured to scan a field of view along the first axis at a first scan rate with radio frequency (RF) beams in a first polarization, and a receive array arranged along a second axis orthogonal to the first axis and configured to receive return RF beams in the first polarization to scan the field of view along the second axis at a second scan rate different from the first scan rate. The various examples described herein enable a radar system to transmit signals along one axis and receive signals along another axis. In the disclosed examples, the geometries of the transmit and receive antennas are orthogonal. In some implementations, the receive antenna can be designed to receive return RF beams in both first and second polarizations separately to speed up the system performance, where the receive antenna operating in the second polarization can be synchronized with the transmit antenna operating in the second polarization to have a coarse scan at either the U-axis or V-axis.

The subject technology is applicable in wireless communication and radar applications, and in particular those incorporating meta-structures capable of manipulating electromagnetic waves using engineered radiating structures. For example, the present disclosure provides for antenna structures having Meta-Structure (MTS) elements and arrays. There are structures and configurations within a feed network to the MTS elements that increase performance of the antenna structures in many applications, including vehicular radar modules. In various examples, the MTS elements include metamaterial elements.

Metamaterials derive their unusual properties from structure rather than composition and they possess exotic properties not usually found in nature. The metamaterials are structures engineered to have properties not found in nature. The metamaterial antennas may take any of a variety of forms, some of which are described herein for comprehension; however, this is not an exhaustive compilation of the possible implementations of the present disclosure. Meta-materials are typically arranged in repeating patterns. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

The subject technology relates to smart active antennas with unprecedented capability of manipulating Radio Frequency (RF) waves to scan an entire environment in a fraction of the time of current systems. The subject technology also relates to smart beam steering and beam forming using MTS radiating structures in a variety of configurations, in which electrical changes to the antenna are used to achieve phase shifting and adjustment reducing the complexity and processing time and enabling fast scans of up to an approximately 360° Field-of-View (FoV) for both long- and short-range object detection. The subject technology uses radar to provide information for 2D image capability as they measure range and azimuth angle, providing distance to an object and azimuth angle identifying a projected location on a horizontal plane, respectively, without the use of traditionally large antenna elements.

The present disclosure relates to radiating structures, such as for radar and cellular antennas, that provide enhanced phase shifting of the transmitted signal to achieve transmission in the autonomous vehicle communication and detection spectrum, which in the US is approximately 77 GHz and has a 5 GHz range, specifically, 76 GHz to 81 GHz, to reduce the computational complexity of the system, and to increase the transmission speed. The disclosure is not limited to these applications and may be readily employed in other antenna applications, such as wireless communications, 5G cellular, fixed wireless and so forth. In some implementations, the present disclosure accomplishes these goals by taking advantage of the properties of MTS elements coupled with novel feed structures.

Autonomous driving is quickly moving from the realm of science fiction to becoming an achievable reality. Already in the market are Advanced-Driver Assistance Systems (ADAS) that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

The present disclosure relates to automotive radar sensors capable of reconstructing the world around them and are effectively a radar "digital eye," having true 3D vision and capable of human-like interpretation of the world. For example, the subject technology supports autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. The sensor performance is also enhanced with these structures, enabling long-range and short-range visibility to the controller. In an automotive application, short-range is considered within 30 meters of a vehicle, such as to detect a person in a cross walk directly in front of the vehicle; and long-range is considered to be 250 meters or more, such as to detect approaching cars on a highway.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

FIG. 1 illustrates an example environment in which a beam steering radar in an autonomous vehicle is used to detect and identify objects, according to various implementations of the subject technology. Ego vehicle 100 is an autonomous vehicle with a beam steering radar system 106 for transmitting a radar signal to scan a FoV or specific area. As described in more detail below, the radar signal is transmitted according to a set of scan parameters that can be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as a camera 102 and a lidar 104. These perception sensors are not required for the ego vehicle 100 but may be useful in augmenting the object detection capabilities of the beam steering radar 106. The camera 102 may be used to detect visible objects and conditions and to assist in the performance of various functions. The lidar 104 can also be used to detect objects and provide this information to adjust control of the ego vehicle 100. This information may include information such as congestion on a highway, road conditions, and other conditions that would impact the sensors, actions or operations of the vehicle. Existing ADAS modules utilize camera sensors to assist drivers in driving functions such as parking (e.g., in rear view cameras). Cameras can capture texture, color and contrast information at a high level of detail, but similar to the human eye, they are susceptible to adverse weather conditions and variations in lighting. The camera 102 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (e.g., less than 150-300 meters). Radars, on the other hand, have been used in vehicles for many years and operate in all-weather conditions. Radar sensors also use far less processing than the other types of sensors and have the advantage of detecting objects behind obstacles and determining the speed of moving objects. When it comes to resolution, the laser beams emitted by the lidar 104 are focused on small areas, have a smaller wavelength than RF signals, and can achieve around 0.25 degrees of resolution.

In various examples and as described in more detail below, the beam steering radar 106 can provide a 360° true 3D vision and human-like interpretation of the path and surrounding environment of the ego vehicle 100. The beam steering radar 106 is capable of shaping and steering RF beams in all directions in a 360° FoV with at least one beam steering antenna and recognize objects quickly and with a high degree of accuracy over a long range of around 300 meters or more. The short-range capabilities of the camera 102 and the lidar 104 along with the long-range capabilities of the radar 106 enable a sensor fusion module 108 in the ego vehicle 100 to enhance its object detection and identification.

As illustrated, the beam steering radar 106 can detect both vehicle 120 at a far range (e.g., greater than 350 m) as well as vehicles 110 and 114 at a short range (e.g., lesser than 100 m). Detecting both vehicles in a short amount of time and with enough range and velocity resolution is imperative for full autonomy of driving functions of the ego vehicle. The radar 106 has an adjustable Long-Range Radar (LRR) mode that enables the detection of long-range objects in a very short time to then focus on obtaining finer velocity resolution for the detected vehicles. Although not described herein, radar 106 is capable of time-alternatively reconfiguring between LRR and Short-Range Radar (SRR) modes. The SRR mode enables a wide beam with lower gain but can make quick decisions to avoid an accident, assist in parking and downtown travel, and capture information about a broad area of the environment. The LRR mode enables a narrow, directed beam and long distance, having high gain; this is powerful for high speed applications, and where longer processing time allows for greater reliability. Excessive dwell time for each beam position may cause blind zones, and the adjustable LRR mode ensures that fast object detection can occur at long range while maintaining the antenna gain, transmit power and desired Signal-to-Noise Ratio (SNR) for the radar operation.

Attention is now directed to FIG. 2, which illustrates a schematic diagram of an autonomous driving system 200 for an ego vehicle in accordance with various implementations of the subject technology. The autonomous driving system 200 is a system for use in an ego vehicle that provides some or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 200 includes a radar system 202 and other sensor systems such as camera 204, lidar 206, infrastructure sensors 208, environmental sensors 210, operational sensors 212, user preference sensors 214, and other sensors 216. The autonomous driving system 200 also includes a communications module 218, a sensor fusion module 220, a system controller 222, a system memory 224, and a Vehicle-to-Vehicle (V2V) communications module 226. It is appreciated that this configuration of the autonomous driving system 200 is an example configuration and not meant to be limiting to the specific structure illustrated in FIG. 2. Additional systems and modules not shown in FIG. 2 may be included in autonomous driving system 200.

In various examples, the beam steering radar 202 includes at least one beam steering antenna for providing dynamically controllable and steerable beams that can focus on one or multiple portions of a 260° FoV of the vehicle. The beams radiated from the beam steering antenna are reflected from objects in the vehicle's path and surrounding environment and received and processed by the radar 202 to detect and identify the objects. The radar 202 includes a perception module that is trained to detect and identify objects and control the radar module as desired. The camera 204 and lidar 206 may also be used to identify objects in the path and surrounding environment of the ego vehicle, albeit at a much lower range.

Infrastructure sensors 208 may provide information from infrastructure while driving, such as from a smart road configuration, billboard information, traffic alerts and indicators, including traffic lights, stop signs, traffic warnings, and so forth. This is a growing area, and the uses and capabilities derived from this information are immense. Environmental sensors 210 detect various conditions outside, such as temperature, humidity, fog, visibility, precipitation, among others. Operational sensors 212 provide information about the functional operation of the vehicle. This may be tire pressure, fuel levels, brake wear, and so forth. The user preference sensors 214 may detect conditions that are part of a user preference. This may be temperature adjustments, smart window shading, etc. Other sensors 216 may include additional sensors for monitoring conditions in and around the ego vehicle.

In various examples, the sensor fusion module 220 optimizes these various functions to provide an approximately comprehensive view of the ego vehicle and environments. Many types of sensors may be controlled by the sensor fusion module 220. These sensors may coordinate with each other to share information and consider the impact of one control action on another system. In one example, in a congested driving condition, a noise detection module (not shown) may identify that there are multiple radar signals that may interfere with the vehicle. This information may be used by a perception module in the radar 202 to adjust the scan parameters of the radar 202 to avoid these other signals and minimize interference.

In another example, environmental sensor 210 may detect that the weather is changing, and visibility is decreasing. In this situation, the sensor fusion module 220 may determine to configure the other sensors to improve the ability of the vehicle to navigate in these new conditions. The configuration may include turning off the camera 204 and/or the lidar 206 or reducing the sampling rate of these visibility-based sensors. This effectively places reliance on the sensor(s) adapted for the current situation. In response, the perception module configures the radar 202 for these conditions as well. For example, the radar 202 may reduce the beam width to provide a more focused beam, and thus a finer sensing capability.

In various examples, the sensor fusion module 220 may send a direct control to the radar 202 based on historical conditions and controls. The sensor fusion module 220 may also use some of the sensors within the autonomous driving system 200 to act as feedback or calibration for the other sensors. In this way, the operational sensor 212 may provide feedback to the perception module and/or to the sensor fusion module 220 to create templates, patterns and control scenarios. These are based on successful actions or may be based on poor results, where the sensor fusion module 220 learns from past actions.

Data from the sensors 202, 204, 206, 208, 210, 212, 214, 216 may be combined in the sensor fusion module 220 to improve the target detection and identification performance of autonomous driving system 200. The sensor fusion module 220 may itself be controlled by the system controller 222, which may also interact with and control other modules and systems in the ego vehicle. For example, the system controller 222 may power on or off the different sensors 202, 204, 206, 208, 210, 212, 214, 216 as desired, or provide instructions to the ego vehicle to stop upon identifying a driving hazard (e.g., deer, pedestrian, cyclist, or another vehicle suddenly appearing in the vehicle's path, flying debris, etc.).

All modules and systems in the autonomous driving system 200 communicate with each other through the communication module 218. The system memory 224 may store information and data (e.g., static and dynamic data) used for operation of the autonomous driving system 200 and the ego vehicle using the autonomous driving system 200. The V2V communications module 226 is used for communication with other vehicles. The V2V communications module 226 may also obtain information from other vehicles that is non-transparent to the user, driver, or rider of the ego vehicle, and may help vehicles coordinate with one another to avoid any type of collision.

Figure 3:
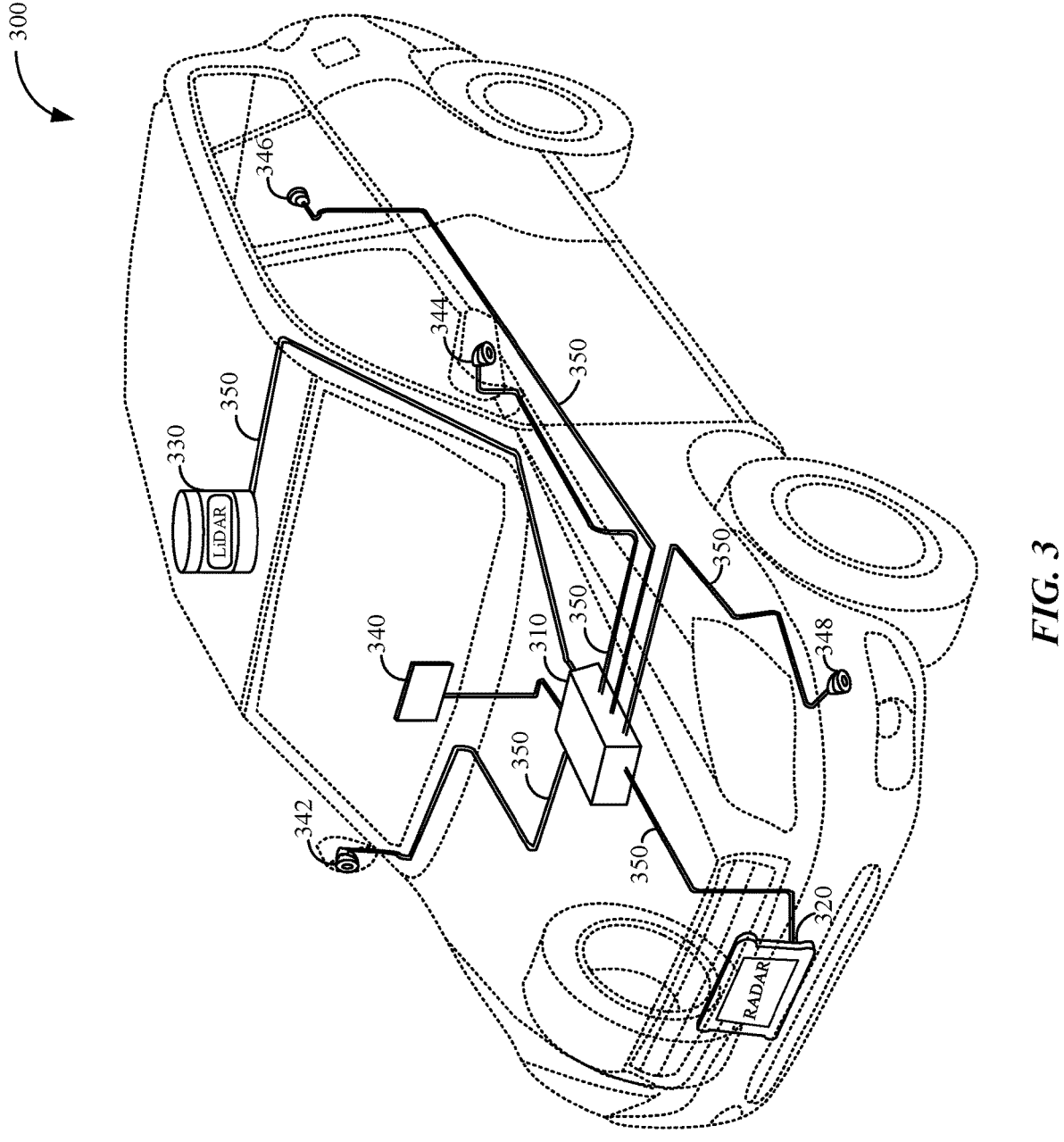
FIG. 3 illustrates an example network environment in which a radar system may be implemented in accordance with one or more implementations of the subject technology.

FIG. 3 illustrates an example network environment 300 in which a radar system may be implemented in accordance with one or more implementations of the subject technology. The example network environment 300 includes a number of electronic devices 320, 330, 340, 342, 344, 346, and 348 that are coupled to an electronic device 310 via the transmission lines 350. The electronic device 310 may communicably couple the electronic devices 342, 344, 346, 348 to one another. In one or more implementations, one or more of the electronic devices 342, 344, 346, 348 are communicatively coupled directly to one another, such as without the support of the electronic device 310. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 350 include wired transmission lines such as Ethernet transmission lines (e.g., 802.3) or wireless transmission lines such as WiFi (e.g., 802.11) or Bluetooth (e.g., 802.15). In this respect, the electronic devices 320, 330, 340, 342, 344, 346, 348 and 310 may implement a physical layer (PHY) that is interoperable with one or more aspects of one or more physical layer specifications, such as those described in the Institute of Electrical and Electronics Engineers (IEEE) 802.3 Standards (e.g., 802.3ch). The electronic device 310 may be, or may include, a switch device, a routing device, a hub device, or generally any device that may communicably couple the electronic devices 320, 330, 340, 342, 344, 346, and 348.

In one or more implementations, at least a portion of the example network environment 300 is implemented within a vehicle, such as a passenger car. For example, the electronic devices 342, 344, 346, 348 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 3, the electronic device 310 is depicted as a central processing unit, the electronic device 320 is depicted as a radar system, the electronic device 330 is depicted as a LiDAR system, the electronic device 340 is depicted as an entertainment interface unit, and the electronic devices 342, 344, 346, 348 are depicted as camera devices, such as forward-view, rear-view and side-view cameras. In one or more implementations, the electronic device 310 and/or one or more of the electronic devices 342, 344, 346, 348 may be communicatively coupled to a public communication network, such as the Internet. In some implementations, the radar system 320 is, or includes at least a portion of, a license plate frame with two-dimensional beam scanning for automotive radar applications as will be discussed in more detail below.

Figure 4:
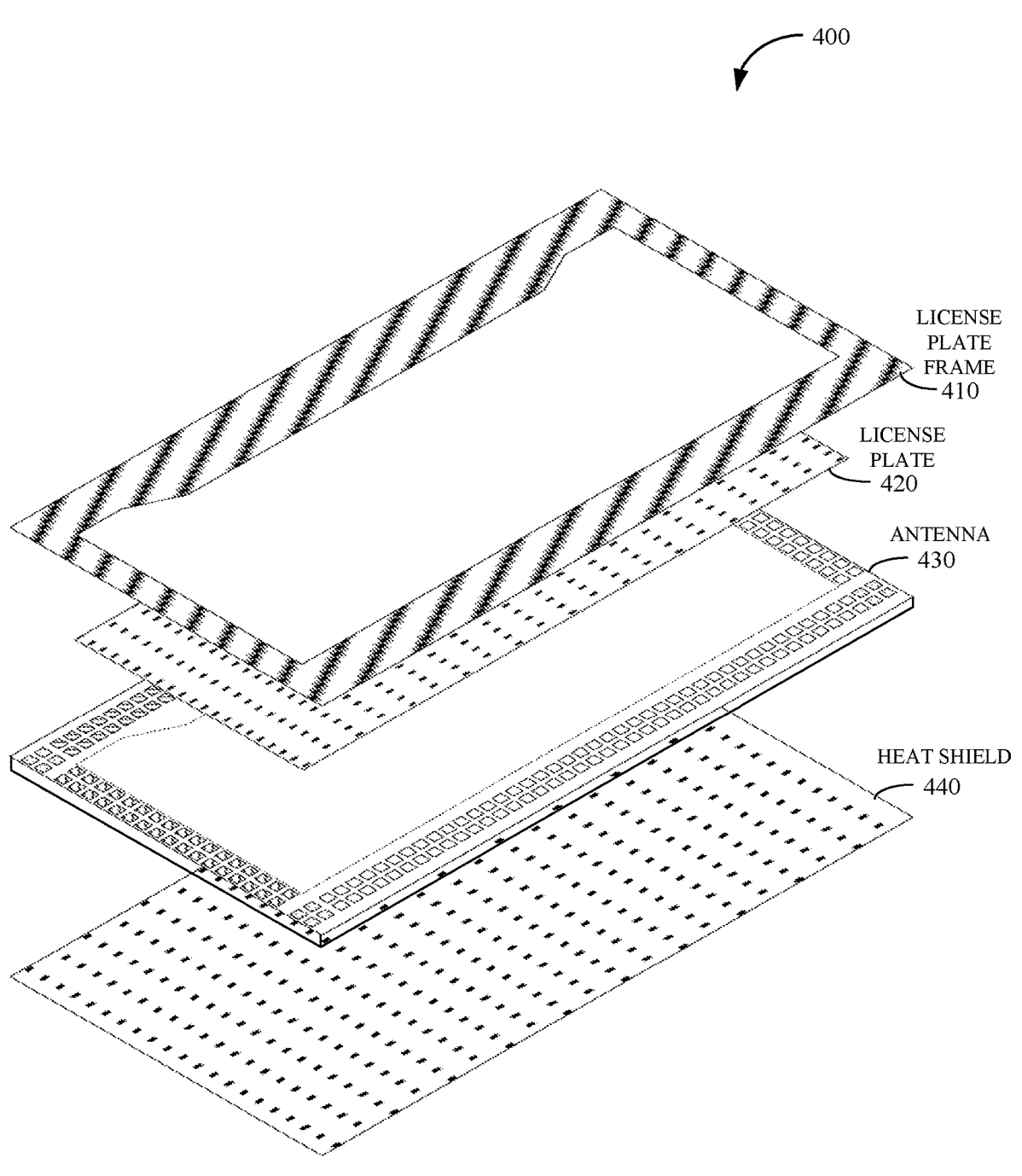
FIG. 4 illustrates an exploded perspective view of an example vehicle license plate frame integrated with a radar system in accordance with some implementations of the subject technology.

FIG. 4 illustrates an exploded perspective view of an example vehicle license plate frame 400 integrated with a radar system in accordance with some implementations of the subject technology. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The vehicle license plate frame 400 includes a license plate frame 410 and an antenna 430. In some implementations, the radar system 320 of FIG. 3 is, or includes at least a portion of, the antenna 430. In some instances, the license plate frame 410 may be fabricated with a dielectric material or a non-conductive material serving as a cover or radome for the antenna 430 as well as a fastener for license plate 420, where the antenna 430 may be a printed circuit board. The antenna 430 may be mechanically coupled to a back surface of the license plate frame 410. In some instances, the antenna 430 may be non-permanently fastened to the license plate frame 410 with fasteners at corners of the license plate frame 410. In other implementations, the antenna 430 may be permanently fastened to the license plate frame 410 with an adhesive resin material. In still other implementations, the antenna 430 and the license plate frame 410 may be fabricated from a same material such that the antenna 430 and the license plate frame 410 are an integrated unit. The license plate 420 may be interposed between the antenna 430 and the license plate frame 410. For example, the license plate 420 may be inserted into a cavity formed when the license plate frame 410 and the antenna 430 are assembled (or mechanically coupled together). In some instances, the license plate frame 410 is, or includes at least a portion of, conformal slot antennas that are excited through coupling with the antenna 430.

In some instances, an enclosure (not shown) may be fabricated with conductive or metallic material that serves as a shield for the electronic components and RF circuitry in the antenna 430 that helps isolate electromagnetic interference to the antenna 430 (e.g., shield against any undesired radiation from feed network). In some instances, the license plate frame 410 has a thickness in a range of 2 mm to 3 mm, a width of about 160 mm and a length of about 312 mm, however, the dimensions of the license plate frame 410 may vary depending on implementation. In some implementations, the vehicle license plate frame 400 also includes a heat sink 440 that helps reduce thermal heating at the antenna 430 and regulate thermal transfer throughout the vehicle license plate frame 400. In other implementations, the license plate 420 may serve as a heatsink to the antenna 430 in lieu of the heat sink 440. In some implementations, license plate frame 410 may include digital circuitry that electrically interacts with the antenna 430 for displaying visual indicators relating to the radar functionality of the antenna 430 (e.g., status indicators). In this respect, the antenna 430 may supply power to the license plate frame 410 through vias formed by means of the mechanical coupling or through a dedicated connector, between the license plate frame 410 and the antenna 430.

Figure 5:
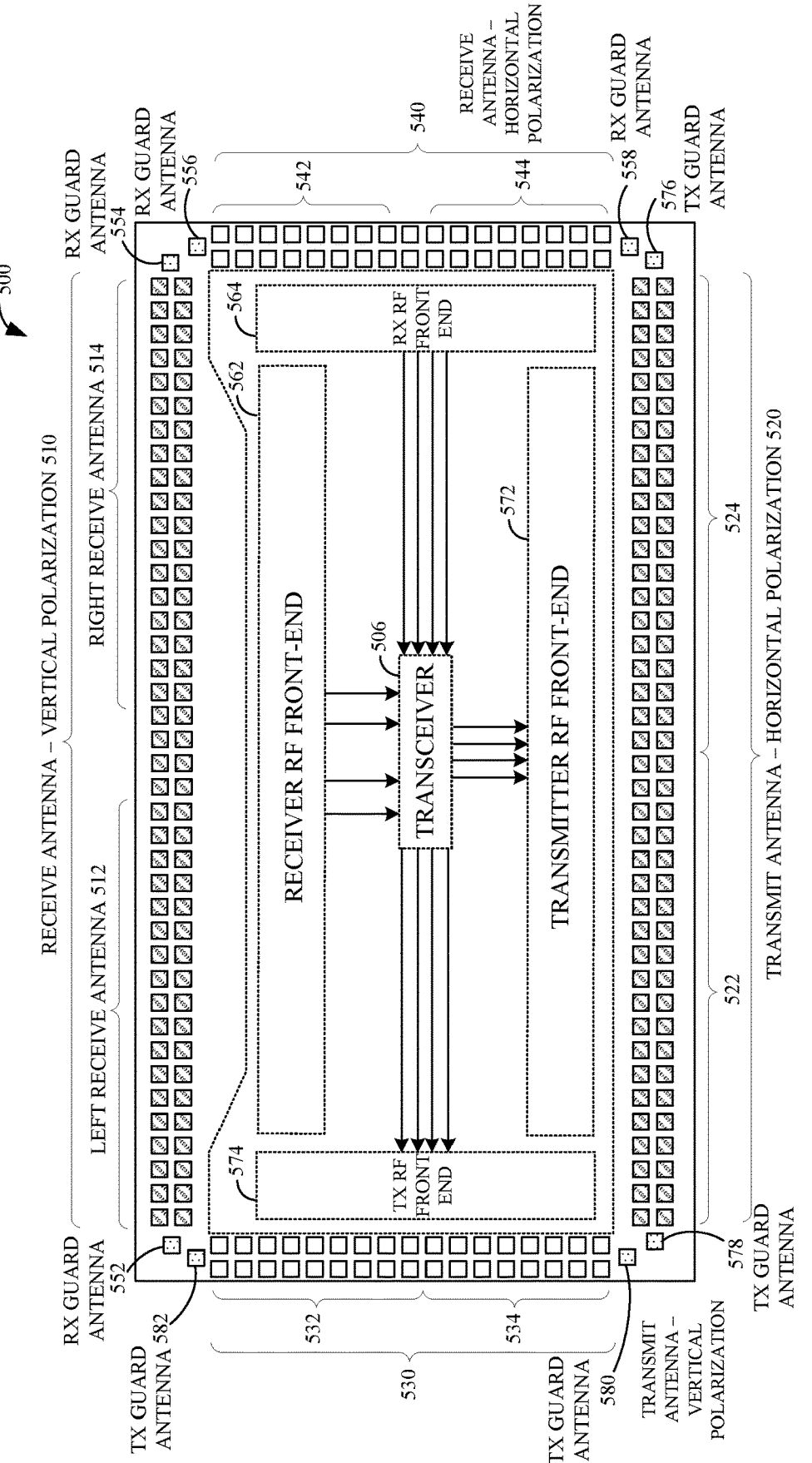
FIG. 5 illustrates a schematic diagram of a radar antenna for use in the vehicle license plate frame of FIG. 4 in accordance with some implementations of the subject technology.

FIG. 5 illustrates a schematic diagram of a radar antenna 500 for use in the vehicle license plate frame 400 of FIG. 4 in accordance with some implementations of the subject technology. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The radar antenna 500 includes multiple antenna arrays for transmission and reception at different polarizations. For example, the radar antenna 500 includes a receive antenna 510 with vertical polarization and a transmit antenna 530 with vertical polarization. The radar antenna 500 also includes a receive antenna 540 with horizontal polarization and a transmit antenna 520 with horizontal polarization. In this respect, the transmit antenna 520 can transmit RF beams in the azimuth direction and the receive antenna 540 can receive return RF beams over the azimuth direction, while the transmit antenna 530 can transmit RF beams in the elevation direction and the receive antenna 510 can receive return RF beams over the elevation direction. In some implementations, the receive antenna 510 includes a left receive antenna 512 and a right receive antenna 514 of which are arranged laterally along the top periphery of the antenna substrate. Similarly, the receive antenna 540 includes a top receive antenna 542 and a bottom receive antenna 544 of which are arranged laterally along the right-side periphery of the antenna substrate. In some instances, the left receive antenna 512 is separated by a predetermined distance from the right receive antenna 514, and the top receive antenna 542 is separated by a predetermined distance from the bottom receive antenna 544. In other implementations, the transmit antenna 520 includes a left transmit antenna 522 and a right transmit antenna 524 of which are arranged laterally along the bottom periphery of the antenna substrate. Similarly, the transmit antenna 530 includes a top transmit antenna 532 and a bottom transmit antenna 534 of which are arranged laterally along the left-side periphery of the antenna substrate. Although the transmit antennas 520 and 530 operate at orthogonal polarizations, the receive antennas 510 and 540 can receive both polarizations and pass the received RF signals to a transceiver 506 in separate channels to speed up the beam scan.

The receive antenna 510 is arranged orthogonal to the transmit antenna 530, while the receive antenna 540 is arranged orthogonal to the transmit antenna 520 (as well as orthogonal to the receive antenna 510). The transmit and receive antennas arrays are arranged in such a manner that aligns with the license plate frame (e.g., 410) layout. For example, the receive antenna 510 may be positioned along a top periphery of the antenna substrate, and the transmit antenna 530 may be positioned along a side periphery (e.g., left side) of the antenna substrate. Similarly, the receive antenna 540 may be positioned along a side periphery (e.g., right-side) of the antenna substrate, and the transmit antenna 520 may be positioned along a bottom periphery of the antenna substrate. Note that as illustrated, there are four antenna arrays 510, 520, 530 and 540. However, the radar antenna 500 may incorporate multiple other antenna arrays. In various examples, each antenna array may be for transmission and/or receiving of radiation patterns.

In some implementations, the radar antenna 500 includes receiver guard antennas 552, 554, 556 and 558 to serve as side lobe filters for the receive antennas 510 and 540. For example, the receiver guard antennas 552 and 554 are arranged proximate to the receive antenna 510. In particular, the receiver guard antenna 552 is arranged proximate to the left receive antenna 512 and the receiver guard antenna 554 is arranged proximate to the right receive antenna 514 such that the receiver guard antennas 552 and 554 are arranged on opposite ends of the receive antenna 510. In this respect, the receiver guard antennas 552 and 554 serve as side lobe filters for the left receive antenna 512 and the right receive antenna 514, respectively. In another example, the receiver guard antennas 556 and 558 are arranged proximate to the receive antenna 540. In particular, the receiver guard antenna 556 is arranged proximate to the top receive antenna 542 and the receiver guard antenna 558 is arranged proximate to the bottom receive antenna 544 such that the receiver guard antennas 556 and 558 are arranged on opposite ends of the receive antenna 540. In this respect, the receiver guard antennas 556 and 558 serve as side lobe filters for the left receive antenna 542 and the right receive antenna 544, respectively. In some implementations, the radar antenna 500 includes transmitter guard antennas 576, 578, 580, 582 for transmit side lobe cancelation with the transmit antennas 520 and 530. For example, the transmitter guard antennas 576 and 578 are arranged proximate to the transmit antenna 520. In particular, the transmitter guard antenna 576 is arranged proximate to the right transmit antenna 524 and the guard antenna 578 is arranged proximate to the left transmit antenna 522 such that the transmitter guard antennas 576 and 578 are arranged on opposite ends of the transmit antenna 520. In this respect, the transmitter guard antennas 576 and 578 serve as side lobe filters for the right transmit antenna 524 and the left transmit antenna 522, respectively. In another example, the transmitter guard antennas 580 and 582 are arranged proximate to the transmit antenna 530. In particular, the transmitter guard antenna 580 is arranged proximate to the bottom transmit antenna 534 and the guard antenna 582 is arranged proximate to the top transmit antenna 532 such that the transmitter guard antennas 580 and 582 are arranged on opposite ends of the transmit antenna 530. In this respect, the transmitter guard antennas 580 and 582 serve as side lobe filters for the bottom transmit antenna 534 and the top transmit antenna 532, respectively.

As illustrated in FIG. 5, the receive arrays 510 and 540 and the transmit arrays 520 and 530 are coupled to the transceiver 506 and are configured such that their radiation beams are orthogonal to each other. In some instances, orthogonal beams can be achieved through orthogonal linear or circular polarization, encoding, chirps or different frequencies. For each transmit and receive pairing, one array scans the vertical angles of the field of view (or U axis), while the other array scans the horizontal angles of the field of view (or V axis). For example, the receive antenna 510 and the transmit antenna 530 may be paired together to scan the U-V axis with radiation beams in the vertical polarization. The receive antenna 510 may be coupled to receiver RF front end 562 and the transmit antenna 530 may be coupled to transmitter RF front end 574. In this respect, the outgoing RF signaling from the transceiver 506 is driven to the transmitter RF front end 574 for radiating through the transmit antenna 530 and return RF signaling received by the receive antenna 510 is driven to the transceiver 506 by the receiver RF front end 562 for processing. In another example, the receive antenna 540 and the transmit antenna 520 may be paired together to scan the U-V axis with radiation beams in the horizontal polarization. The receive antenna 540 may be coupled to receiver RF front end 564 and the transmit antenna 520 may be coupled to transmitter RF front end 572. In this respect, the outgoing RF signaling from the transceiver 506 is driven to the transmitter RF front end 572 for radiating through the transmit antenna 520 and return RF signaling received by the receive antenna 540 is driven to the transceiver 506 by the receiver RF front end 564 for processing. In some instances, the receiver RF front ends 562 and 564 may include low-noise amplifiers, phase shift elements, analog-to-digital converters, combination networks and other receiver circuitry along the receive chain to the transceiver 506. In some instances, the transmitter RF front ends 572 and 574 may include power amplifiers, phase shift elements, feed networks, and other transmitter circuitry along the transmit chain to the transmit antennas 520 and 530.

In some implementations, the number of receiver inputs to the transceiver 506 from either of the two receive arrays may vary depending on the linear array size of the receiver antennas. For example, there may be four groups of 32 elements for a 128-element linear array, which produces four inputs to the transceiver 506. In another example, there may be eight (8) groups of 16 elements for the 128-element linear array, which produces eight inputs to the transceiver 506. In still another example, there may be two groups of 32 elements for a 64-element linear array, which produces two inputs to the transceiver 506. In yet another example, there may be four groups of 16 elements for the 64-element linear array, which produces four inputs to the transceiver 506. This antenna clustering can improve the overall system performance relying more on digital signal processing.

In some implementations, there is one transmitter output by the transceiver 506 to the transmit arrays in either polarizations (e.g., azimuth, elevation). In other implementations, the transceiver 506 may output more than one transmitter output to the transmit arrays for both polarizations.

In some implementations, each of the transmit and receive antennas produce a shaped beam, such as a fan beam, where the main beam has a narrow beam-width in one dimension (e.g., about 20° in elevation) and a wider beam-width in the other dimension (e.g., about 40° in azimuth). To scan a direction, the phase shift elements apply a phase shift to the signaling on a corresponding transmission line to a transmit antenna or from a receive antenna to shape the output radiation beam in a target direction. The phase shifting enables the radar antenna 500 to scan in the vertical or elevation with one array while the other array is phase shifted to scan the horizontal or azimuth. For example, the receive antenna 540 is controlled by the transceiver 506 through the receiver RF front end 564 so that the receive antenna 540 scans the elevation angle range, and the transmit antenna 520 is controlled by the transceiver 506 through the transmitter RF front end 572 so that the transmit antenna 520 scans the azimuth angle range.

In some implementations, the scanning in the azimuth angle range is performed at a scan rate that is different from that in the elevation angle range. In particular, the scan rate along the azimuth angle range (or U-axis) is greater than the scan rate along the elevation angle range (or V-axis). For example, the scan rate along the elevation angle range may be about 10 Hz, while the scan rate along the azimuth angle range may be about 10 kHz. The scan rates along the azimuth and elevation angle ranges may vary depending on implementation. In some instances, the receive antenna 540 operates in conjunction with the transmit antenna 530 for one-dimensional (1D) scanning in the elevation plane, and concurrently, the receive antenna 510 operates in conjunction with the transmit antenna 520 for 1D scanning in the azimuth plane to perform a quick scan of the frame. In some implementations, the receive antennas (e.g., 510, 540) can operate to receive return RF beams in both polarizations.

Figure 6:
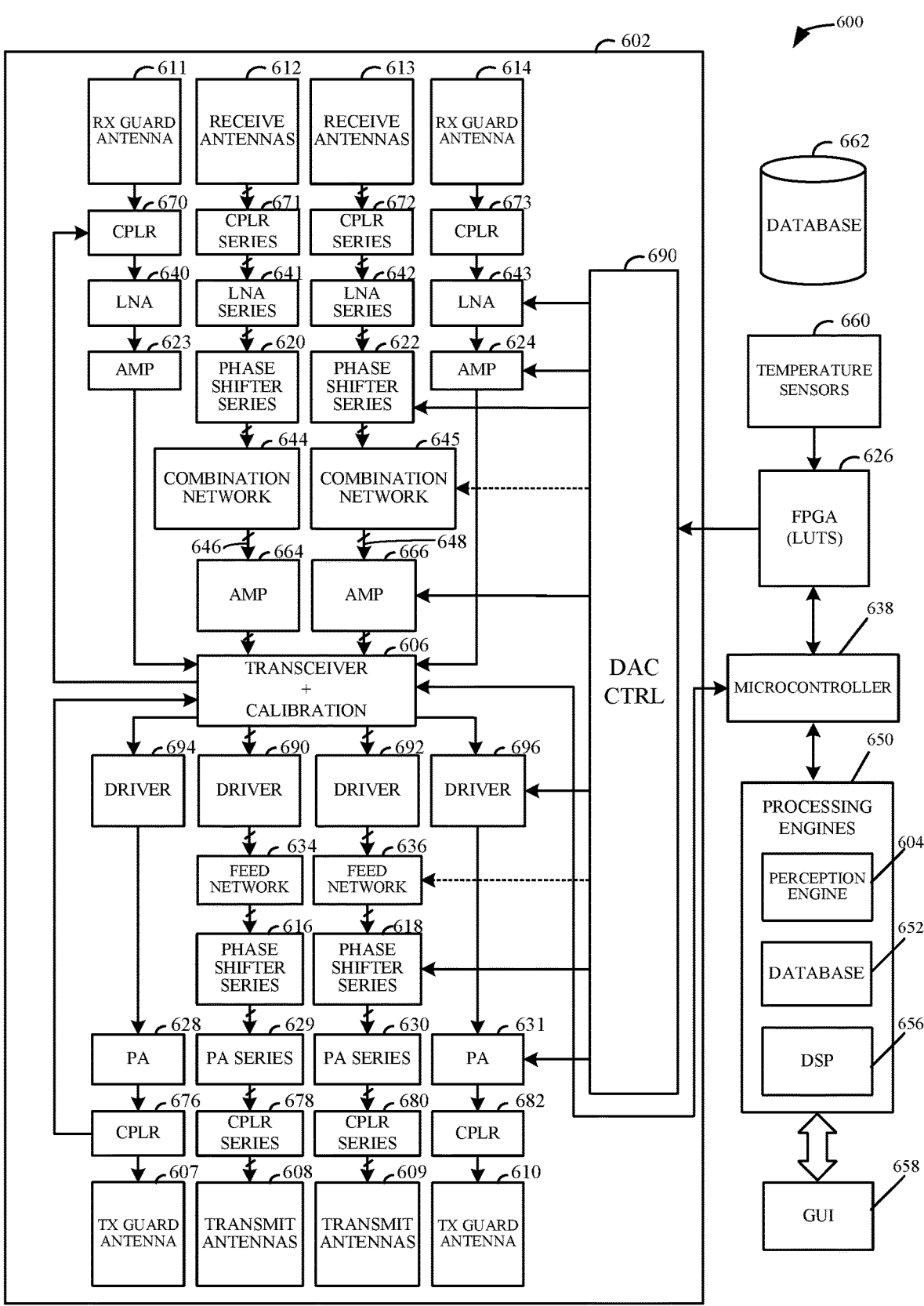
FIG. 6 illustrates a schematic diagram of a radar system in accordance with various implementations of the subject technology.

FIG. 6 illustrates a schematic diagram of a radar system 600 in accordance with various implementations of the subject technology. The radar module 600 includes a radar module 602 that includes a receive chain and a transmit chain. The receive chain includes receive antennas 612 and 613, receive guard antennas 611 and 614, couplers 670-673, low-noise amplifiers (LNAs) 640-643, phase shifter (PS) circuits 620 and 622, amplifiers 623, 624, 664 and 666, and combination networks 644 and 645. The transmit chain includes drivers 690, 692, 694 and 696, feed networks 634 and 636, PS circuits 616 and 618, power amplifiers 628-631, couplers 676, 678, 680 and 682, transmit antennas 608 and 609, and transmit guard antennas 607 and 610. The radar module 602 also includes a transceiver 606, a digital-to-analog (DAC) controller 690, a Field-Programmable Gate Array (FPGA) 626, a microcontroller 638, processing engines 650, a General User Interface (GUI) 658, temperature sensors 660 and a database 662. The processing engines 650 includes perception engine 604, database 652 and Digital Signal Processor (DSP) 656. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, the transceiver 506 of FIG. 5 is, or includes at least a portion of the transceiver 606. The receive antenna 510 may correspond to receive antenna 612 and the receive antenna may correspond to receive antenna 613. Receive guard antennas 552 and 554 may correspond to guard antennas 611 and 614. Additional guard antennas may be added to radar module 602 to correspond to receive guard antennas 556 and 558 of FIG. 5. In some examples, the receiver RF front end 562 of FIG. 5 includes at least the couplers 670, 671, the LNAs 640, 641, the PS circuit 620, the amplifiers 623, 664 and the combination network 644. In some examples, the receiver RF front end 564 of FIG. 5 includes the couplers 672, 673, the LNAs 642, 643, the PS circuit 622, the amplifiers 624, 666 and the combination network 645. In some examples, the transmitter RF front end 572 of FIG. 5 includes the couplers 676, 678, the power amplifiers 628, 629, the PS circuit 616, the feed network 634 and the drivers 690 and 694. In some examples, the transmitter RF front end 574 of FIG. 5 includes the couplers 680, 682, the power amplifiers 630, 631, the PS circuit 618, the feed network 636 and the drivers 692 and 696. In some implementations, the DAC controller 690 may be included in each of the receiver RF front ends 562, 564 and transmitter RF front ends 572, 574. In other implementations, the DAC controller 690 may be coupled to each of the receiver RF front ends 562, 564 and transmitter RF front ends 572, 574 as a separate circuit on the same printed circuit board as that of the RF front-end modules. In some implementations, the electronic device 310 of FIG. 3 may include one or more of the FPGA 626, the microcontroller 638, the processing engines 650, the temperature sensors 660 or the database 662. In some implementations, the electronic device 340 of FIG. 3 is, or includes at least a portion of, the GUI 658.

Radar module 602 is capable of both transmitting RF signals within a FoV and receiving the reflections of the transmitted signals as they reflect from objects in the FoV. With the use of analog beamforming in radar module 602, a single transmit and receive chain can be used effectively to form a directional, as well as a steerable, beam. A transceiver 606 in radar module 602 can generate signals for transmission through a series of transmit antennas 608 and 609 as well as manage signals received through a series of receive antennas 612 and 613. In some implementations, the transmit antennas 608 include a first set of transmit antennas in a first polarization (e.g., transmit antenna 520) and the transmit antennas 609 include a second set of transmit antennas in a second polarization orthogonal to the first polarization (e.g., transmit antenna 530). For example, the transmit antennas 608 may be horizontal polarized and the transmit antennas 609 may be vertically polarized. Conversely, in other implementations, the transmit antennas 609 may be horizontally polarized and the transmit antennas 608 may be vertically polarized. In other examples, the transmit antennas 608 may be right hand circular polarized and the transmit antennas 609 may be left hand circular polarized. Similarly, the receive antennas 612 include a first set of receive antennas in a first polarization (e.g., receive antenna 510) and the receive antennas 613 include a second set of receive antennas in a second polarization (e.g., receive antenna 540). Beam steering within the FoV is implemented with phase shifter (PS) circuits 616 and 618 coupled to the transmit antennas 608 and 609, respectively, on the transmit chain and PS circuits 620 and 622 coupled to the receive antennas 612 and 613, respectively, on the receive chain. Careful phase and amplitude calibration of the transmit antennas 608, 609 and receive antennas 612, 613 can be performed in real-time with the use of couplers integrated into the radar module 602 as described in more detail below. In other implementations, calibration is performed before the radar is deployed in an ego vehicle and the couplers may be removed.

The use of PS circuits 616, 618 and 620, 622 enables separate control of the phase of each element in the transmit antennas 608, 609 and receive antennas 612, 613. Unlike early passive architectures, the beam is steerable not only to discrete angles but to any angle (i.e., from 0° to 360°) within the FoV using active beamforming antennas. A multiple element antenna can be used with an analog beamforming architecture where the individual antenna elements may be combined or divided at the port of the single transmit or receive chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar system 600 with a significantly longer detection range.

The major challenge with implementing analog beam steering is to design PSs to operate at 77 GHz. PS circuits 616, 618 and 620, 622 solve this problem with a reflective PS design implemented with a distributed varactor network fabricated using suitable semiconductor materials, such as Gallium-Arsenide (GaAs) materials, among others. Each PS circuit 616, 618 and 620, 622 has a series of PSs, with each PS coupled to an antenna element to generate a phase shift value of anywhere from 0° to 360° for signals transmitted or received by the antenna element. The PS design is scalable in future implementations to other semiconductor materials, such as Silicon-Germanium (SiGe) and CMOS, bringing down the PS cost to meet specific demands of customer applications. Each PS circuit 616, 618 and 620, 622 is controlled by a Field Programmable Gate Array (FPGA) 626, which provides a series of voltages to the PSs in each PS circuit that results in a series of phase shifts.

The DAC controller 690 is coupled to each of the LNAs 640-643, the amplifiers 623, 624, 664, 666, PS circuits 616, 618, 620, 622, the drivers 690, 692, 694, 696, and the power amplifiers (PAs) 628-631. In some instances, the DAC controller 690 is coupled to the FPGA 626, and the FPGA 626 can drive digital signaling to the DAC controller 690 to provide analog signaling to the LNAs 640-643, the amplifiers 623, 624, 664, 666, PS circuits 616, 618, 620, 622, the drivers 690, 692, 694, 696, and the PAs 628-631. In some implementations, the DAC controller 690 is coupled to the combination networks 644, 645 and to the feed networks 634, 636.

In various examples, an analog control signal is applied to each PS in the PS circuits 616, 618 and 620, 622 by the DAC controller 690 to generate a given phase shift and provide beam steering. The analog control signals applied to the PSs in PS circuits 616, 618 and 620, 622 are based on voltage values that are stored in Look-up Tables (LUTs) in the FPGA 626. These LUTs are generated by an antenna calibration process that determines which voltages to apply to each PS to generate a given phase shift under each operating condition. Note that the PSs in PS circuits 616, 618 and 620, 622 can generate phase shifts at a very high resolution of less than one degree. This enhanced control over the phase allows the transmit and receive antennas in radar module 602 to steer beams with a very small step size, improving the capability of the radar system 600 to resolve closely located targets at small angular resolution.

In various examples, each of the transmit antennas 608, 609 and the receive antennas 612, 613 may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. Various configurations, shapes, designs and dimensions of the transmit antennas 608, 609 and the receive antennas 612, 613 may be used to implement specific designs and meet specific constraints.

The transmit chain in the radar module 602 starts with the transceiver 606 generating RF signals to prepare for transmission over-the-air by the transmit antennas 608 and 609 in their respective polarization. The RF signals may be, for example, Frequency-Modulated Continuous Wave (FMCW) signals. An FMCW signal enables the radar system 600 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 606, the FMCW signals are fed to drivers 690 and 692. From the drivers 690 and 692, the signals are divided and distributed through feed networks 634 and 636, respectively, which form a power divider system to divide an input signal into multiple signals, one for each element of the transmit antennas 608 and 609, respectively. The feed networks 634 and 636 may divide the signals so power is equally distributed among them or alternatively, so power is distributed according to another scheme, in which the divided signals do not all receive the same power. Each signal from the feed networks 634 and 636 is then input to the PS circuits 616 and 618, respectively, where the FMCW signals are phase shifted based on control signaling from the DAC controller 690 (corresponding to voltages generated by the FPGA 626 under the direction of microcontroller 638), and then transmitted to the PAs 629 and 630. Signal amplification is needed for the FMCW signals to reach the long ranges desired for object detection, as the signals attenuate as they radiate by the transmit antennas 608 and 609. From the PAs 629 and 630, the FMCW signals are fed to couplers 678 and 680, respectively, to generate calibration signaling that is fed back to the transceiver 606. From the couplers 678 and 680, the FMCW signals are transmitted through transmit antennas 608 and 609 to radiate the outgoing signaling in the respective polarization. In some implementations, the PS circuit 616 is coupled to the transmit antennas 608 operating in a first polarization (e.g., horizontal polarization) through the PA 629 and coupler 678, and the PS circuit 618 is coupled to the transmit antennas 609 operating in a second polarization (e.g., vertical polarization) through the PA 630 and coupler 680.

In some instances, the transceiver 606 feeds the FMCW signals to drivers 694 and 696, which are then fed to PAs 628 and 632 and to the couplers 676 and 682. From these couplers, the FMCW signals are fed to the transmit guard antennas 607 and 610 for side lobe cancelation of the transmission signal.

The microcontroller 638 determines which phase shifts to apply to the PSs in PS circuits 616, 618, 620 and 622 according to a desired scanning mode based on road and environmental scenarios. Microcontroller 638 also determines the scan parameters for the transceiver to apply at its next scan. The scan parameters may be determined at the direction of one of the processing engines 650, such as at the direction of perception engine 604. Depending on the objects detected, the perception engine 604 may instruct the microcontroller 638 to adjust the scan parameters at a next scan to focus on a given area of the FoV or to steer the beams to a different direction.

In various examples and as described in more detail below, radar system 600 operates in one of various modes, including a full scanning mode and a selective scanning mode, among others. In a full scanning mode, the transmit antennas 608, 609 and the receive antennas 612, 613 can scan a complete FoV with small incremental steps. Even though the FoV may be limited by system parameters due to increased side lobes as a function of the steering angle, radar system 600 is able to detect objects over a significant area for a long-range radar. The range of angles to be scanned on either side of boresight as well as the step size between steering angles/phase shifts can be dynamically varied based on the driving environment. To improve performance of an autonomous vehicle (e.g., an ego vehicle) driving through an urban environment, the scan range can be increased to keep monitoring the intersections and curbs to detect vehicles, pedestrians or bicyclists. This wide scan range may deteriorate the frame rate (revisit rate) but is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, the radar system 600 scans around an area of interest by steering to a desired angle and then scanning around that angle. This ensures the radar system 600 is to detect objects in the area of interest without wasting any processing or scanning cycles illuminating areas with no valid objects. Since the radar system 600 can detect objects at a long distance, e.g., 300 m or more at boresight, if there is a curve in a road, direct measures do not provide helpful information. Rather, the radar system 600 steers along the curvature of the road and aligns its beams towards the area of interest. In various examples, the selective scanning mode may be implemented by changing the chirp slope of the FMCW signals generated by the transceiver 606 and by shifting the phase of the transmitted signals to the steering angles needed to cover the curvature of the road.

Objects are detected with radar system 600 by reflections or echoes that are received at the receive antennas 612 and 613 in the respective polarization. The received signaling is then fed to couplers 672 and 673 using feedback calibration signaling from the transceiver 606. The couplers 670, 672-674 can allow probing to the receive chain signal path. From the couplers 672 and 673, the received signaling is fed to LNAs 641 and 642. The LNAs 641 and 642 are positioned between the receive antennas 612 and 613 and PS circuits 620 and 622, which include PSs similar to the PSs in PS circuits 616 and 618. For receive operation, PS circuits 620 and 622 create phase differentials between radiating elements in the receive antennas 612 and 613 to compensate for the time delay of received signals between radiating elements due to spatial configurations. Receive phase-shifting, also referred to as analog beamforming, combines the received signals for aligning echoes to identify the location, or position of a detected object. That is, phase shifting aligns the received signals that arrive at different times at each of the radiating elements in receive antennas 612 and 613. Similar to PS circuits 616, 618 on the transmit chain, PS circuits 620, 622 are controlled by the DAC controller 690, which provides control signaling to each PS to generate the desired phase shift. In some instances, the FPGA 626 can provide bias voltages to the DAC controller 690 to generate the control signaling to PS circuits 620, 622.

The receive chain then combines the signals fed by the PS circuits 620 and 622 at the combination networks 644 and 645, respectively, from which the combined signals propagate to the amplifiers 664 and 666 for signal amplification. The amplified signal is then fed to the transceiver 606 for receiver processing. Note that as illustrated, the combination networks 644 and 645 can generate multiple combined signals 646 and 648, of which each signal combines signals from a number of elements in the receive antennas 612 and 613, respectively. In one example, the receive antennas 612 and 613 include 128 and 64 radiating elements partitioned into two 64-element and 32-element clusters, respectively. For example, the signaling fed from each cluster is combined in a corresponding combination network (e.g., 644, 645) and delivered to the transceiver 606 in a separate RF transmission line. In this respect, each of the combined signals 646 and 648 can carry two RF signals to the transceiver 606, where each RF signal combines signaling from the 64-element and 32-element clusters of the receive antennas 612 and 613. Other examples may include 8, 26, 34, or 62 elements, and so on, depending on the desired configuration. The higher the number of antenna elements, the narrower the beam width. In some implementations, the combination network 644 is coupled to the receive antennas 612 operating in the first polarization (e.g., horizontal polarization) and the combination network 645 is coupled to receive antennas 613 operating in the second polarization (e.g., vertical polarization). In some instances, the receive guard antennas 610 and 614 feed the receiving signaling to couplers 670 and 674, respectively, which are then fed to LNAs 640 and 643. The filtered signals from the LNAs 640 and 643 are fed to amplifiers 623 and 624, respectively, which are then fed to the transceiver 606 for side lobe cancelation of the received signals by the receiver processing.

In some implementations, the radar module 602 includes receive guard antennas 610 and 614 that generate a radiation pattern separate from the main beams received by the 64-element receive antennas 612 and 613. The receive guard antennas 610 and 614 are implemented to effectively eliminate side-lobe returns from objects. The goal is for the receive guard antennas 610 and 614 to provide a gain that is higher than the side lobes and therefore enable their elimination or reduce their presence significantly. The receive guard antennas 610 and 614 effectively act as a side lobe filter. Similar, the radar module 602 includes transmit guard antennas 607 and 610 to eliminate side lobe formation or reduce the gain generated by transmitter side lobes at the time of a transmitter main beam formation by the transmit antennas 608 and 609.

Once the received signals are received by transceiver 606, the received signals are processed by processing engines 650. Processing engines 650 include perception engine 604 that detects and identifies objects in the received signal with one or more neural networks using machine learning or computer vision techniques, database 652 to store historical and other information for radar system 600, and the DSP engine 654 with an Analog-to-Digital Converter (ADC) module to convert the analog signals from transceiver 606 into digital signals that can be processed to determine angles of arrival and other valuable information for the detection and identification of objects by perception engine 604. In one or more implementations, DSP engine 656 may be integrated with the microcontroller 638 or the transceiver 606.

Radar system 600 also includes a Graphical User Interface (GUI) 658 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In addition, radar system 600 has a temperature sensor 660 for sensing the temperature around the vehicle so that the proper voltages from FPGA 626 may be used to generate the desired phase shifts. The voltages stored in FPGA 626 are determined during calibration of the antennas under different operating conditions, including temperature conditions. A database 662 may also be used in radar system 600 to store radar and other useful data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception engine 604 controls further operation of the transmit antennas 608 and 609 by, for example, providing an antenna control signal containing beam parameters for the next RF beams to be radiated from MTM cells in the transmit antennas 608.

In operation, the microcontroller 638 is responsible for directing the transmit antennas 608 and 609 to generate RF beams in a respective polarization with determined parameters such as beam width, transmit angle, and so on. The microcontroller 638 may, for example, determine the parameters at the direction of perception engine 604, which may at any given time determine to focus on a specific area of a FoV upon identifying targets of interest in the ego vehicle's path or surrounding environment. The microcontroller 638 determines the direction, power, and other parameters of the RF beams and controls the transmit antennas 608 and 609 to achieve beam steering in various directions. The microcontroller 638 also determines a voltage matrix to apply to reactance control mechanisms coupled to the transmit antennas 608 and 609 to achieve a given phase shift. In some examples, the transmit antennas 608 and 609 are adapted to transmit a directional beam through active control of the reactance parameters of the individual MTM cells that make up the transmit antennas 608 and 609.

Next, the transmit antennas 608 and 609 radiate RF beams having the determined parameters. The RF beams are reflected from targets in and around the ego vehicle's path (e.g., in a 360° field of view) and are received by the transceiver 606. The receive antennas 612 and 613 send the received 4D radar data to the perception engine 604 for target identification.

In various examples, the perception engine 604 can store information that describes an FoV. This information may be historical data used to track trends and anticipate behaviors and traffic conditions or may be instantaneous or real-time data that describes the FoV at a moment in time or over a window in time. The ability to store this data enables the perception engine 604 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception engine 604 may determine to narrow the beam width for a more focused view of that sector or area in the FoV. The next scan may indicate the targets' length or other dimension, and if the target is a vehicle, the perception engine 604 may consider what direction the target is moving and focus the beams on that area. Similarly, the echo may be from a spurious target, such as a bird, which is small and moving quickly out of the path of the vehicle. The database 652 coupled to the perception engine 604 can store useful data for radar system 600, such as, for example, information on which subarrays of the transmit antennas 608 and 609 perform better under different conditions.

In various examples described herein, the use of radar system 600 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 55 km/h, a driver may need to slow down to 50 km/h when visibility is poor. Using the radar system 600, the driver (or driverless vehicle) may maintain the maximum safe speed without regard to the weather conditions. Even if other drivers slow down, a vehicle enabled with the radar system 600 can detect those slow-moving vehicles and obstacles in its path and avoid/navigate around them.

Additionally, in highly congested areas, it is necessary for an autonomous vehicle to detect targets in sufficient time to react and take action. The examples provided herein for a radar system increase the sweep time of a radar signal to detect any echoes in time to react. In rural areas and other areas with few obstacles during travel, the perception engine 604 adjusts the focus of the RF beam to a larger beam width, thereby enabling a faster scan of areas where there are few echoes. The perception engine 604 may detect this situation by evaluating the number of echoes received within a given time period and making beam size adjustments accordingly. Once a target is detected, the perception engine 604 determines how to adjust the beam focus. This is achieved by changing the specific configurations and conditions of the transmit antennas 608. In one example scenario, a subset of unit cells is configured as a subarray. This configuration means that this set may be treated as a single unit, and all the cells within the subarray are adjusted similarly. In another scenario, the subarray is changed to include a different number of unit cells, where the combination of unit cells in a subarray may be changed dynamically to adjust to conditions and operation of the radar system 600.

All of these detection scenarios, analysis and reactions may be stored in the perception engine 604, such as in the database 652, and used for later analysis or simplified reactions. For example, if there is an increase in the echoes received at a given time of day or on a specific highway, that information is fed into the microcontroller 638 to assist in proactive preparation and configuration of the transmit antennas 608 and 609. Additionally, there may be some subarray combinations that perform better, such as to achieve a desired result, and this is stored in the database 652.

Figure 7:
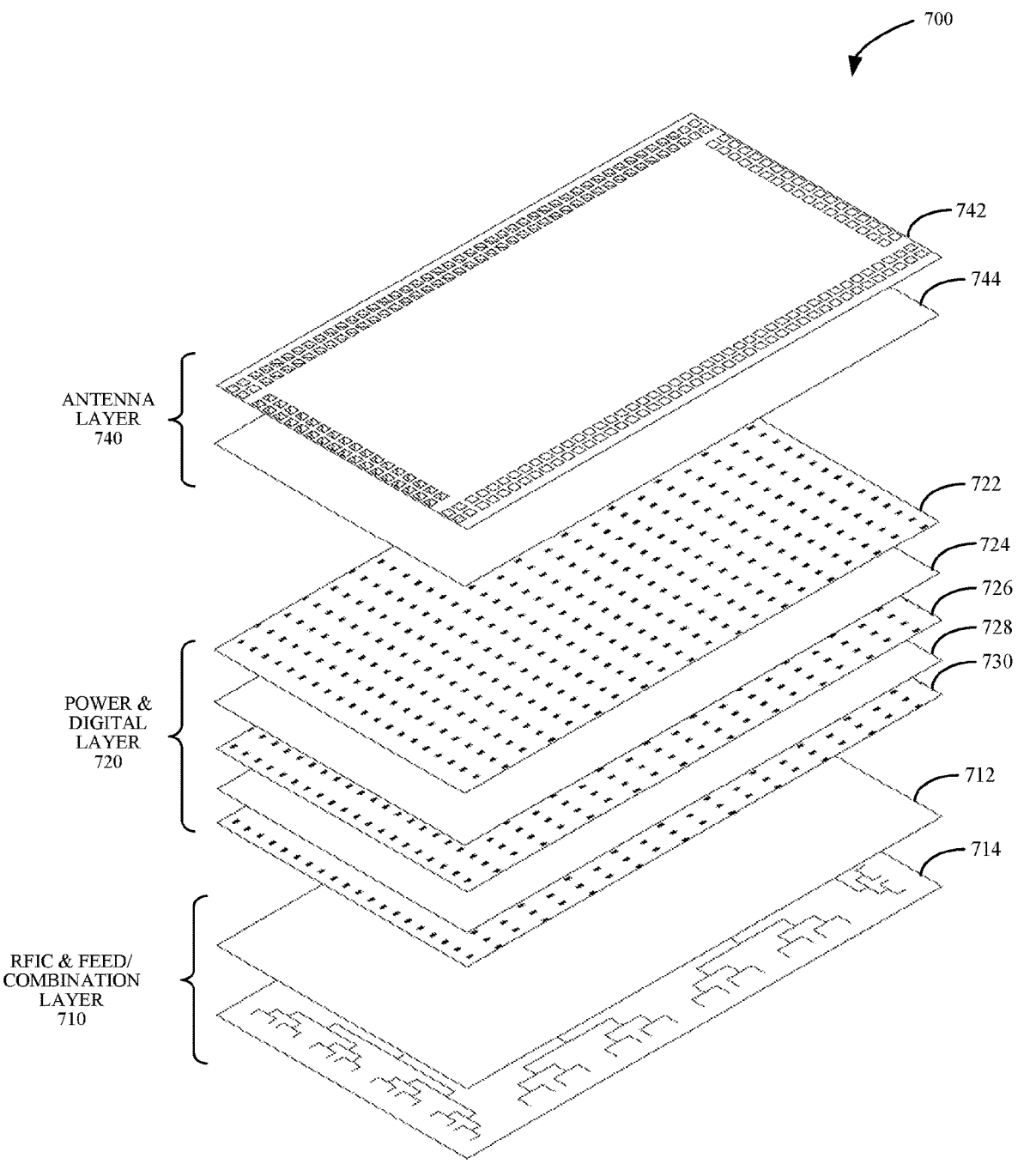
FIG. 7 illustrates an exploded perspective view of an example stack-up configuration of an antenna structure in accordance with some implementations of the subject technology.

FIG. 7 illustrates an exploded perspective view of an example stack-up configuration of an antenna structure 700 in accordance with some implementations of the subject technology. The antenna structure 700 is shown oriented with the x-y-z axis as illustrated. The antenna structure 700 includes an RFIC and feed/combination layer 710, a power and digital layer 720 and an antenna layer 740. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The present disclosure is described with respect to a radar system, where the antenna structure 700 is a structure having a corporate feed structure, such as the RFIC and feed/combination layer 710, with an array of transmission lines feeding a radiating array, such as the antenna layer 740, through the power and digital layer 720. In some implementations, the power and digital layer 720 includes a plurality of transmission lines coupled to power supplies and digital logic circuitry within conductive material and the antenna layer 740 is a lattice structure of unit cell radiating elements proximate the transmission lines. The RFIC and feed/combination layer 710 may include a coupling module for providing an input signal to the transmission lines, or a portion of the transmission lines. In some implementations, the coupling module is a power divider circuit that divides the input signal among the plurality of transmission lines, in which the power may be distributed equally among the N transmission lines or may be distributed according to another scheme, such that the N transmission lines do not all receive a same signal strength.

The RFIC and feed/combination layer 710 includes a ground plane layer 712 and a signal plane layer 714. The signal plane layer 714 may include a feed network for transmit operations and a combination network for receive operations. The feed network may include power amplifiers for signal amplification and the combination network may include low-noise amplifiers for low-noise signal filtration. Each of the feed network and the combination network are coupled to respective phase shifter networks (not shown) included in the RFIC and feed/combination layer 710 for beam steering.

In some implementations, the signal plane layer 714 includes a separate feed network for each of transmit antennas in the respective polarization and a separate combination network for each of the receive antennas in the respective polarization. In this respect, the transmit antennas in the horizontal polarization are coupled to a first feed network with vias penetrating through the internal layering that includes the power and digital layer 720, while the transmit antennas in the vertical polarization are coupled to a second feed network through corresponding vias. Similarly, the receive antennas in the horizontal polarization are coupled to a first combination network through corresponding vias, while the receive antennas in the vertical polarization are coupled to a second combination network through corresponding vias. In other implementations, the transmit antennas associated with the two polarizations may share a common feed network, while the receive antennas associated with the two polarizations may share a common combination network.

In some implementations, one or more of the layers in the RFIC and feed/combination layer 710 may include a substrate formed of a polytetrafluoroethylene material having predetermined parameters (e.g., low dielectric loss) that are applicable to high frequency circuits. In some instances, a polytetrafluoroethylene substrate can exhibit thermal and phase stability across temperature and can be used in automotive radar and microwave applications.

The power and digital layer 720 includes signal plane layers 722, 726 and 730 and ground plane layers 724 and 728. The signal plane layers 722, 726 and 730 may include power supplies, such as DC power, and digital logic circuitry. Each of the feed and combination layer 714 and the power and digital layers (e.g., 722, 724, 726, 728, 730) includes a dielectric layer interposed between two conductive layers. In some instances, each of the conductive layers and the dielectric layer has a predetermined thickness (e.g., 20 mm for the dielectric layer thickness).

The antenna layer 740 includes an antenna 742 and a ground plane layer 744. The antenna 742 includes the receive antennas in both polarizations and the transmit antennas in both polarizations. The antenna 742 has a number of radiating elements creating paths for transmitted RF signals or reflections received from objects. In various examples, the radiating elements are patches or meta-structures in an array configuration such as in a 128-element transmit antenna in the horizontal polarization (and a 64-element transmit antenna in the vertical polarization) or a 64-element receive antenna in the vertical polarization (and 128-element receive antenna in the horizontal polarization). This may produce a Half Power Beam Width (HPBW) of about 1° in azimuth and HPBW of about 1.6° in elevation to meet any EIRP requirements. In some examples, the antenna 742 may include an array of slot elements. In other examples, the antenna 742 may include an array of patch antennas.

The antenna layer 740 may be composed of individual radiating elements discussed herein. The antenna layer 740 may take a variety of forms and is designed to operate in coordination with the power and digital layer 720, in which individual radiating elements correspond to elements within the power and digital layer 720. As used herein, the "unit cell element" is referred to as an "MTS unit cell" or "MTS element," and these terms are used interchangeably throughout the present disclosure without departing from the scope of the subject technology. The MTS unit cells include a variety of conductive structures and patterns, such that a received transmission signal is radiated therefrom. The MTS unit cell may serve as an artificial material, meaning a material that is not naturally occurring. Each MTS unit cell has some unique properties. These properties include a negative permittivity and permeability resulting in a negative refractive index; these structures are commonly referred to as left-handed materials (LHM). The use of LHM enables behavior not achieved in classical structures and materials. The MTS array is a periodic arrangement of unit cells that are each smaller than the transmission wavelength. In some instances, each of the unit cell elements has a uniform size and shape; however, alternate and other implementations may incorporate different sizes, shapes, configurations and array sizes.

The antenna structure 700 may include multiple RFICs embedded into the RFIC and feed/combination layer 710, such as to correspond to the number of path levels in a feed network or combination network of the RFIC and feed/combination layer 710 or to the number of patch antennas in the antenna 742. The signal plane layer 714 in the RFIC and feed/combination layer 710 may include, or be coupled to, a connector (not shown). In some implementations, the antenna 742 may include a number of RF sub-components in lieu of fabrication on the RFIC and feed/combination layer 710.

The RFIC and feed/combination layer 710 includes phase shifters (e.g., a phase shift network) to achieve any desired phase shift in a range of 0° to 360°. In some instances, the phase shifters can provide a single analog beam with a phase shift. In some implementations, the phase shifter can be an IQ demodulator, where the signal is divided into two I and Q signals and the phase of the signal changes by modifying the ratio between the I and Q signals and combining them. In other implementations, the phase shifter can be a digital beam former, which can provide multiple digital signals at different phases to be radiated or received by antennas, to improve the system performance using multiple beams. In this respect, the phase shifters may have a connection to the antenna elements with the exclusion of a feed network located therebetween. The RFIC and feed/combination layer 710 may include transitions from the RFIC and feed/combination layer 710 to the antenna layer 740. In some implementations, the RFIC and feed/combination layer 710 includes a control circuit.

In some implementations, the RFIC and feed/combination layer 710 includes a reactance control mechanism (e.g., a phase shifter RFIC) controlled by the microcontroller 438 (FIG. 4) to control the phase of a transmission signal as it radiates from the patch antennas in the antenna layer 740. In some implementations, the microcontroller 438 determines a voltage matrix to apply to the reactance control mechanism to achieve a given phase shift or other antenna parameters.

When the transmission signal is provided to the antenna structure 700, such as through a coaxial cable or other connector, the transmission signal propagates through the RFIC and feed/combination layer 710 to the power and digital layer 720 through which the transmission signal radiates to the antenna layer 740 for transmission through the air. The transmission line may have various portions, in which a first portion receives an transmission signal as an input, such as from a coaxial cable or other supply structure, and the transmission signal traverses a substrate portion to divide the transmission signal through a corporate feed-style network resulting in multiple transmission lines that feed the phase shift network (or reactance control mechanism). The phase shift network includes multiple phase control elements having one or more phase shifters. The transmission signal radiates through these phase control elements to the antenna layer 740, which may include an array of MTS elements. Control of the array of MTS elements results in a directed signal or beamform.

Figure 8:
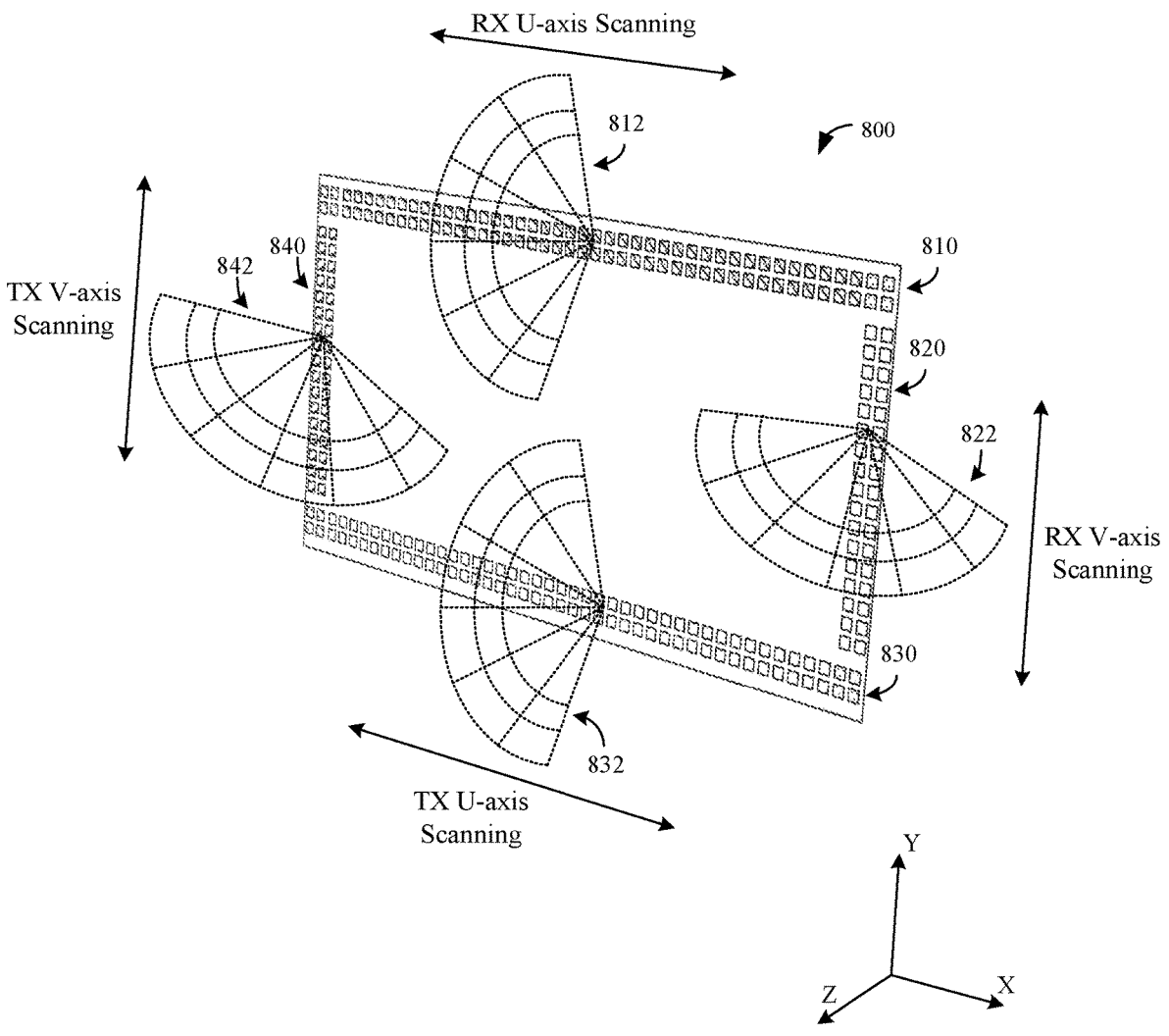
FIG. 8 illustrates a schematic diagram of example transmit and receive antennas producing radiating beams in dual polarizations in accordance with some implementations of the subject technology.

FIG. 8 illustrates a schematic diagram of an example of a radar antenna 800 having transmit antennas and receive antennas producing radiating beams in dual polarizations in accordance with some implementations of the subject technology. The radar antenna 800 includes a first receive array 810, a second receive array 820, a first transmit array 830 and a second transmit array 840.

The first receive array 810 produces a receive beam 812 with vertical polarization directed in the z-direction, in which phase shift elements tied to the individual unit cells of the first receive array 810 apply a phase shift to change the phase of the incident signal and thereby scan in the U-axis (or azimuth direction). The receive beam 812 illustrated identifies a receive area of the first receive array 810, meaning that the first receive array 810 can detect objects within that area.

The first transmit array 830 produces a radiating beam 832 with horizontal polarization directed in the z-direction, in which phase shift elements coupled to the individual unit cells of the first transmit array 830 change the phase of the radiated signal and thereby scan in the U-axis (or azimuth direction). The radiation beam 832 illustrated identifies a transmit area of the first transmit array 830, meaning that the first transmit array 830 is used to illuminate objects within that area.

The second receive array 820 produces a receive beam 822 with horizontal polarization directed in the z-direction, in which phase shift elements coupled to the individual unit cells of the second receive array 820 change the phase of the radiated signal and thereby scan in the V-axis (or elevation direction). The radiation beam 822 illustrated identifies a receive area of the second receive array 820, meaning that the second receive array 820 can detect objects within that area.

The second transmit array 840 produces a radiating beam 842 with vertical polarization directed in the z-direction, in which phase shift elements tied to the individual unit cells of the second transmit array 840 change the phase of the radiated signal and thereby scan in the V-axis (or elevation direction). The radiation beam 842 illustrated identifies a transmit area of the second transmit array 840, meaning that the second transmit array 840 is used to illuminate objects within that area.

The receive array 810 and the transmit array 840 are directed into the z-direction, so the arrays 810 and 840 have an overlap region in the U-V domain when scanning the V-axis angle range and U-axis angle range, respectively. In some instances, the first receive array 810 and the second receive array 820 are dual-polarized, in which the receive and transmit arrays of the same polarization can be grouped to provide a fan beam in the same plane such that a coarse beam can illuminate the plane for a quick 1D scan in the azimuth and elevation planes.

Figure 9:
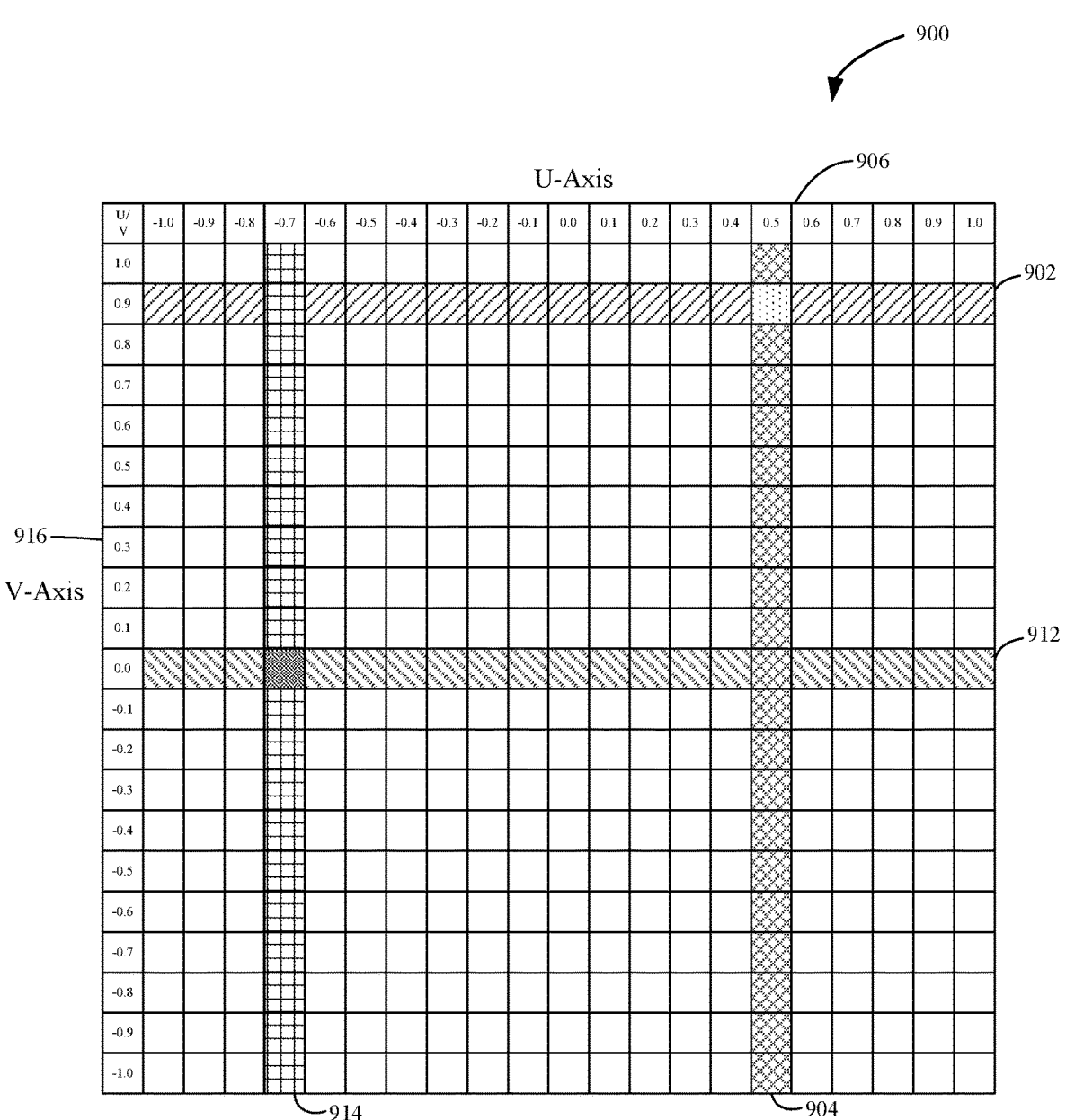
FIG. 9 illustrates a plot diagram of two-dimensional beam scanning of orthogonal antenna selections in accordance with some implementations of the subject technology.

FIG. 9 illustrates a plot diagram 900 of two-dimensional beam scanning of orthogonal antenna selections with an antenna array system in accordance with some implementations of the subject technology. The antenna array system enables steering of beamforms on orthogonal axes, in which the intersection of the beamform patterns has a directivity referred to herein as an artificial directivity or an effective directivity. In such systems, where a transmission pattern is on a first axis, such as a horizontal or azimuth axis, and a receive pattern is on a second axis orthogonal to the first axis, such as a vertical or elevation axis, the intersection of the patterns provides artificially enhanced directivity where a horizontal beam intersects with a vertical beam.

The plot diagram 900 depicts a first transmit scan 902 in the V-axis that scans with a fan beam, and a first receive scan 904 in the U-axis that scans with a fan beam, both in the horizontal polarization. In this respect, the U-axis scanning is handled by the RX fan beam and the V-axis scanning is handled by the TX fan beam. The radar link can have the U-V scanning when the RX and TX radiation patterns are multiplied.

The transmit antennas transmit in a first direction, referred to here as the z-direction, and scan across the horizontal or azimuth in the x-direction. The receive antennas are directed in the z-direction and scan in the vertical or elevation in the y-direction. Each set of antennas, and each individual antenna, has an associated radiation beamform. Where these beamforms can cross or intersect is the active aperture of the antenna system. The active aperture is therefore a combination of the multiple beams, having its own beam width and height. For example, the transmit antenna with the first transmit scan 902 and receive antenna with the first receive scan 904 form active aperture 906.

The plot diagram 900 also depicts a second transmit scan 914 in the U-axis that scans with a fan beam, and a second receive scan 912 in the V-axis that scans with a fan beam, both in the vertical polarization. Similarly, the transmit antenna with the second transmit scan 914 and receive antenna with the second receive scan 912 form active aperture 916.

Figure 10:
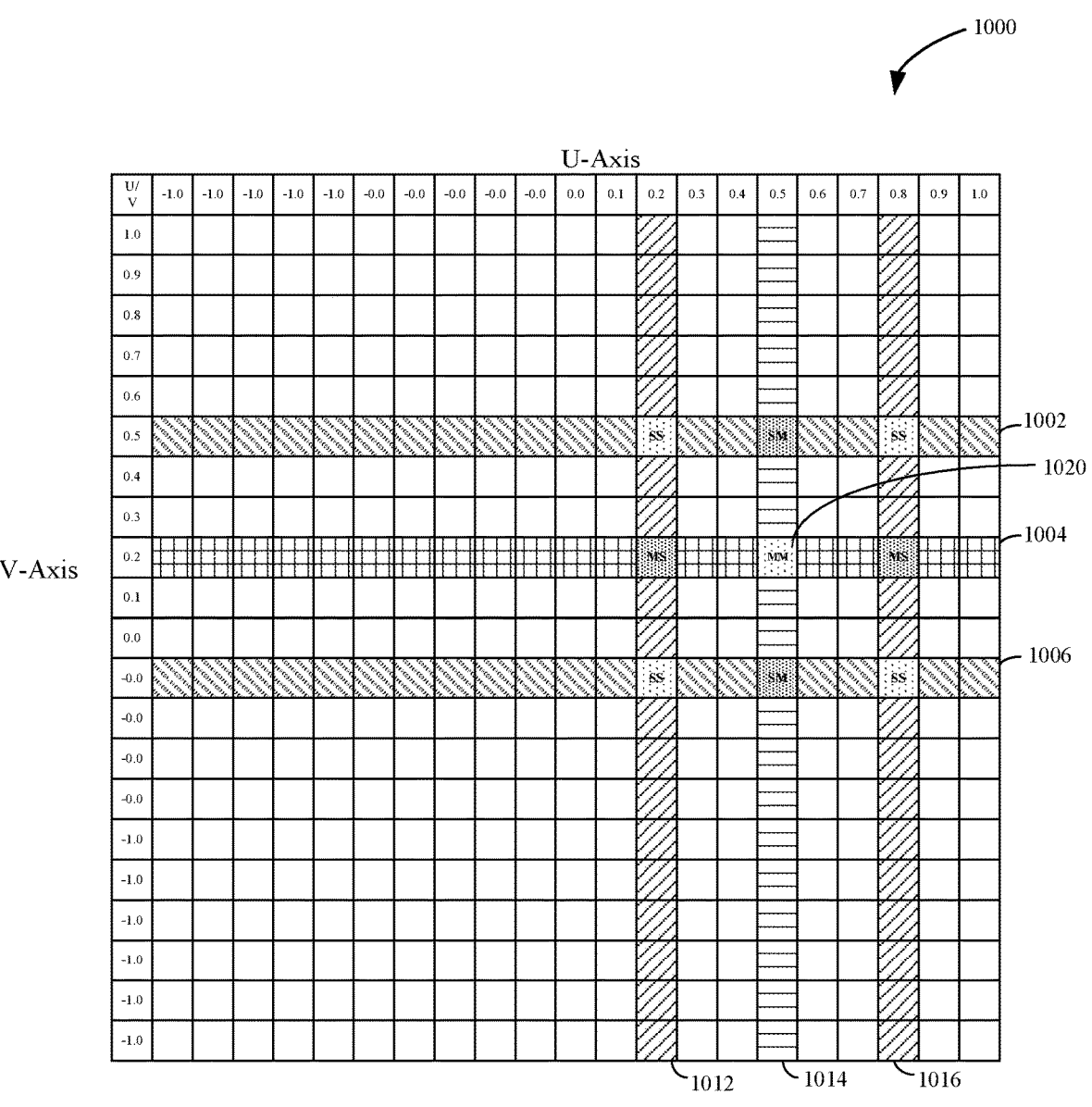
FIG. 10 illustrates a plot diagram of two-dimensional beam scanning with main lobe and side lobe levels in accordance with some implementations of the subject technology.

FIG. 10 illustrates a plot diagram 1000 of two-dimensional beam scanning with main lobe and side lobe levels in accordance with some implementations of the subject technology. The plot diagram 1000 depicts main lobe scan 1004 (depicted as "TX main lobe") and side lobe scans 1002 and 1006 (depicted as "TX sidelobe") that relate to the transmitter beams with horizontal polarization in the V-axis, and main lobe scan 1014 (depicted as "RX main lobe") and side lobe scans 1012 and 1016 (depicted as "RX side lobe") that relate to the receiver beams with horizontal polarization in the U-axis. The intersection of the main lobe scans 1004 and 1014 form active aperture 1020 (depicted as "MM"). Other intersections of the TX main lobe (e.g., 1004) with the RX side lobes (e.g., 1012 and 1016) form intersections depicted as "MS." Similarly, other intersections of the RX main lobe (e.g., 1014) with the TX side lobes (e.g., 1002 and 1006) form intersections depicted as "SM." Remaining intersections among the side lobe scans for both RX and TX are depicted as "SS." In some implementations, the SM and MS intersections are normalized to MM, resulting in −30 dB gain, while the SS intersections are also normalized to MM that results in −60 dB gain.

Figure 11:
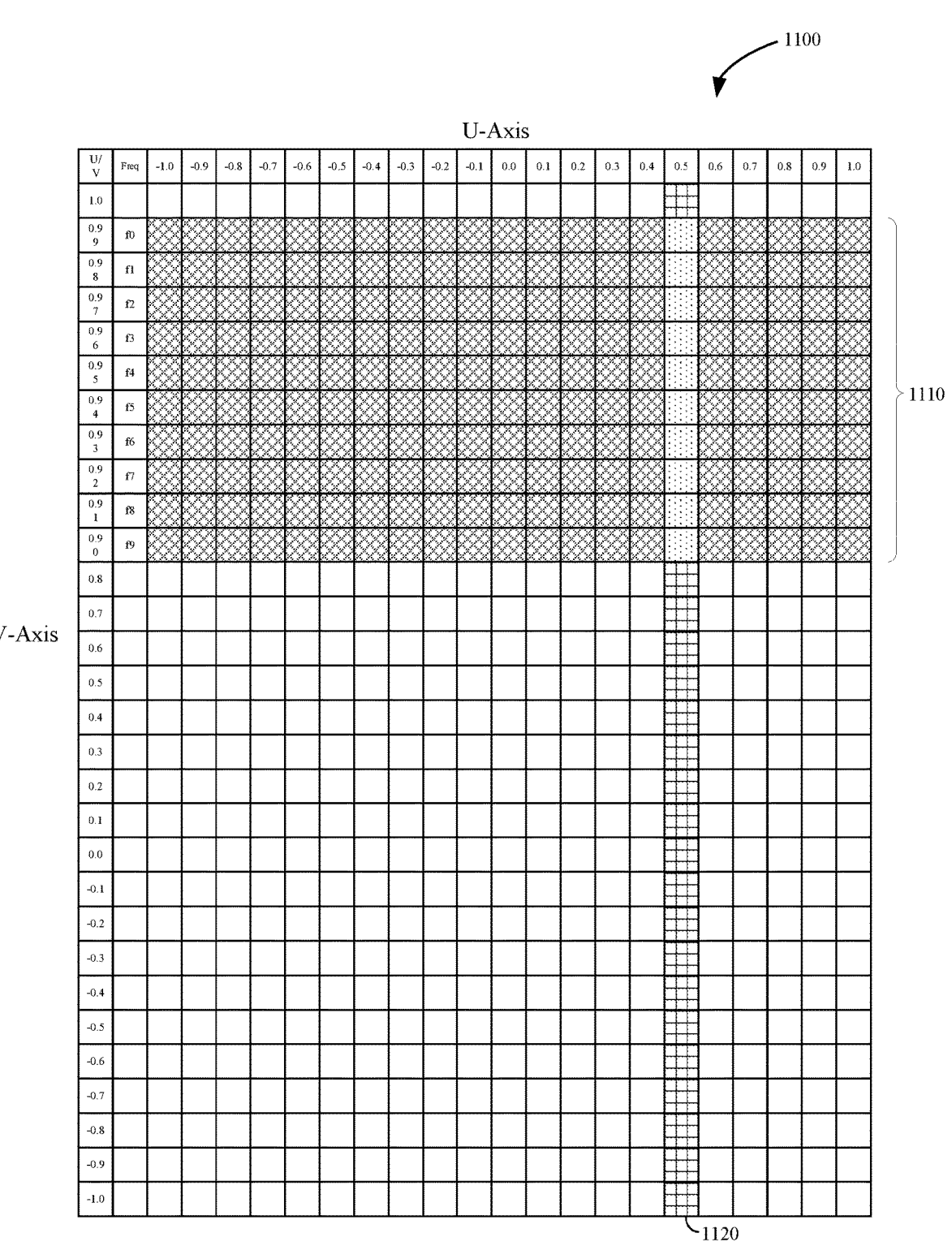
FIG. 11 illustrates a plot diagram of two-dimensional beam scanning with multiple frequency chirp in accordance with some implementations of the subject technology.

FIG. 11 illustrates a plot diagram 1100 of two-dimensional beam scanning with multiple frequency chirp in accordance with some implementations of the subject technology. The plot diagram 1100 depicts transmit scans 1110 in the V-axis across multiple frequencies (depicted as "f0-f9"), and a receive scan 1120 in the U-axis. In this respect, the transmit scans 1110 represent multiple frequency chirps transmitted concurrently with horizontal polarization. In some instances, the number of chirps can help to improve the Signal-to-Noise Ratio (SNR). In this respect, the number of chirps can be modified to improve the SNR at the expense of lowering the antenna system performance. The receive scan 1120 can intersect the transmit scans 1110 at the particular frequencies (e.g., f0-f9) to form an active aperture that spans multiple frequencies, and thereby provide improved scanning capability of the antenna array system. As noted above, the transmit scan with the multiple frequency chirps in the V-axis can operate with a scan rate of about 100 Hz, whereas the receive scan in the U-axis can operate with a scan rate of about 10 kHz. In some implementations, using more advanced beam formers and transceiver, the frequencies f0-f9 can be any type of orthogonal signal that includes orthogonal codes, multi-beams, and so on.

Figure 12:
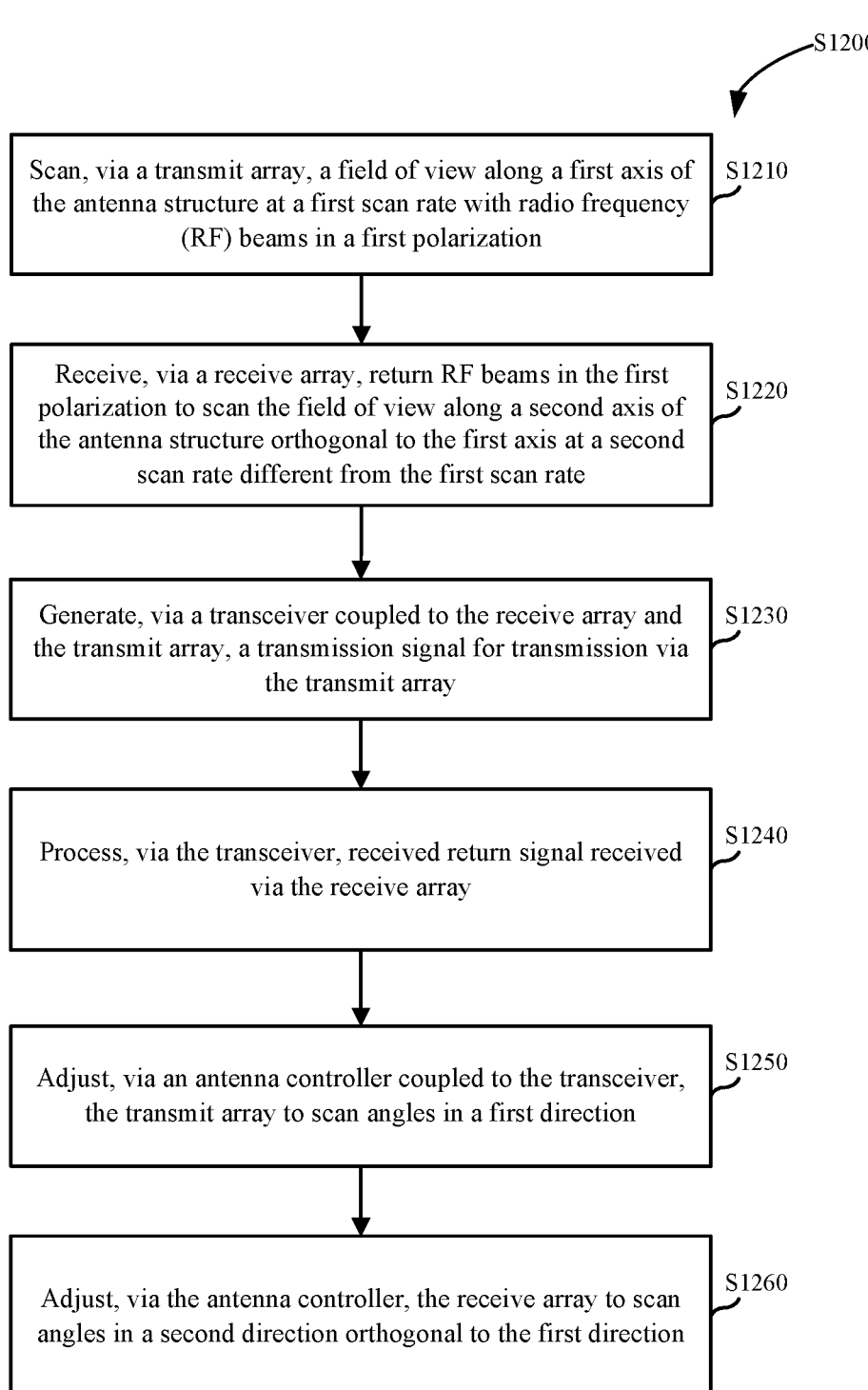
FIG. 12 illustrates a flow chart for a method of operating an antenna structure, in accordance with various implementations.

FIG. 12 illustrates a flow chart for a method S1200 of operating an antenna structure, in accordance with various implementations. The method S1200 includes scanning, via a transmit array, a field of view along a first axis of the antenna structure at a first scan rate with radio frequency (RF) beams in a first polarization, at step S1210. The method S1200 includes, at step S1220, receiving, via a receive array, return RF beams in the first polarization to scan the field of view along a second axis of the antenna structure orthogonal to the first axis at a second scan rate different from the first scan rate. In various embodiments of the method S1200, the receive array includes a first plurality of receive antennas associated with the first polarization and a second plurality of receive antennas associated with a second polarization orthogonal to the first polarization, and the transmit array includes a first plurality of transmit antennas associated with the first polarization and a second plurality of transmit antennas associated with the second polarization. In various embodiments, the first plurality of receive antennas is arranged orthogonal to the first plurality of transmit antennas, and the second plurality of receive antennas is arranged orthogonal to the second plurality of transmit antennas. In various embodiments, the first axis corresponds to an azimuth dimension and the second axis corresponds to an elevation dimension, and wherein the second scan rate is greater than the first scan rate. In various embodiments, the first axis corresponds to an elevation dimension and the second axis corresponds to an azimuth dimension, and wherein the second scan rate is lesser than the first scan rate.

In various embodiments, the method S1200 includes generating, via a transceiver coupled to the receive array and the transmit array, a transmission signal for transmission via the transmit array, at step S1230. The method S1200 includes, at step S1240, processing, via the transceiver, a return signal received via the receive array. In various embodiments, the antenna structure further includes a first feed network coupled between the transceiver and the first plurality of transmit antennas; and a second feed network coupled between the transceiver and the second plurality of transmit antennas, wherein the second feed network is independent of the first feed network.

At step S1250, the method S1200 includes adjusting, via an antenna controller coupled to the transceiver, the transmit array to scan angles in a first direction. At step S1260, the method S1200 includes adjusting, via the antenna controller, the receive array to scan angles in a second direction orthogonal to the first direction.

In various embodiments, the antenna structure further includes a first combination network coupled between the transceiver and the first plurality of receive antennas; and a second combination network coupled between the transceiver and the second plurality of receive antennas, wherein the second combination network is independent of the first combination network.

In accordance with various embodiments, an antenna system is disclosed. The antenna system includes a transmit array arranged along a first axis and configured to scan a field of view along the first axis at a first scan rate with radio frequency (RF) beams in a first polarization; a receive array arranged along a second axis orthogonal to the first axis and configured to receive return RF beams in the first polarization to scan the field of view along the second axis at a second scan rate different from the first scan rate; a transceiver coupled to the receive array and the transmit array, the transceiver configured to generate a transmission signal for transmission via the transmit array and to process a received return signal received via the receive array; and an antenna controller coupled to the transceiver and configured to adjust the transmit array to scan angles in a first direction and adjust the receive array to scan angles in a second direction orthogonal to the first direction.

In various embodiments of the antenna system, the receive array includes a first plurality of receive antennas arranged along the second axis and configured to receive return RF beams in the first polarization to scan the field of view along the second axis at the second scan rate; and a second plurality of receive antennas arranged along the first axis and configured to receive return RF beams in a second polarization orthogonal to the first polarization to scan the field of view along the first axis at the first scan rate. In various embodiments of the antenna system, the transmit array includes a first plurality of transmit antennas arranged along the first axis and configured to scan the field of view along the first axis at the first scan rate with the RF beams in the first polarization; and a second plurality of transmit antennas arranged along the second axis and configured to scan the field of view along the second axis at the second scan rate with the RF beams in the second polarization.

In various embodiments, the first axis corresponds to an azimuth dimension and the second axis corresponds to an elevation dimension, and wherein the second scan rate is greater than the first scan rate. In various embodiments, the first axis corresponds to an elevation dimension and the second axis corresponds to an azimuth dimension, and wherein the second scan rate is lesser than the first scan rate.

In various embodiments, the antenna system further includes a first feed network coupled between the transceiver and the first plurality of transmit antennas and a second feed network coupled between the transceiver and the second plurality of transmit antennas, wherein the second feed network is independent of the first feed network. In various embodiments, the antenna system further includes a first combination network coupled between the transceiver and the first plurality of receive antennas and a second combination network coupled between the transceiver and the second plurality of receive antennas, wherein the second combination network is independent of the first combination network.

In accordance with various embodiments, a method of operating an antenna structure is disclosed. The method includes scanning, via a transmit array, a field of view along a first axis of the antenna structure at a first scan rate with radio frequency (RF) beams in a first polarization; receiving, via a receive array, return RF beams in the first polarization to scan the field of view along a second axis of the antenna structure orthogonal to the first axis at a second scan rate different from the first scan rate; generating, via a transceiver coupled to the receive array and the transmit array, a transmission signal for transmission via the transmit array; processing, via the transceiver, received return signal received via the receive array; adjusting, via an antenna controller coupled to the transceiver, the transmit array to scan angles in a first direction; and adjusting, via the antenna controller, the receive array to scan angles in a second direction orthogonal to the first direction.

In various embodiments of the method, the receive array includes a first plurality of receive antennas associated with the first polarization and a second plurality of receive antennas associated with a second polarization orthogonal to the first polarization, and the transmit array includes a first plurality of transmit antennas associated with the first polarization and a second plurality of transmit antennas associated with the second polarization.

In various embodiments, the first plurality of receive antennas is arranged orthogonal to the first plurality of transmit antennas, and the second plurality of receive antennas is arranged orthogonal to the second plurality of transmit antennas. In various embodiments, the first axis corresponds to an azimuth dimension and the second axis corresponds to an elevation dimension, and wherein the second scan rate is greater than the first scan rate. In various embodiments, the first axis corresponds to an elevation dimension and the second axis corresponds to an azimuth dimension, and wherein the second scan rate is lesser than the first scan rate.

In various embodiments, the antenna structure further includes a first feed network is configured to couple between the transceiver and the first plurality of transmit antennas; and a second feed network is configured to couple between the transceiver and the second plurality of transmit antennas, wherein the second feed network is independent of the first feed network.

In various embodiments, the antenna structure further includes a first combination network configured to couple between the transceiver and the first plurality of receive antennas; and a second combination network configured to couple between the transceiver and the second plurality of receive antennas, wherein the second combination network is independent of the first combination network.

In accordance with various embodiments, an antenna structure is disclosed. The antenna structure includes a transmit array arranged along a first axis and configured to scan a field of view along the first axis at a first scan rate with radio frequency (RF) beams in a first polarization, wherein the transmit array includes a first plurality of transmit antennas associated with the first polarization and a second plurality of transmit antennas associated with the second polarization. The antenna structure also includes a receive array arranged along a second axis orthogonal to the first axis and configured to receive return RF beams in the first polarization to scan the field of view along the second axis at a second scan rate different from the first scan rate, wherein the receive array includes a first plurality of receive antennas associated with the first polarization and a second plurality of receive antennas associated with a second polarization orthogonal to the first polarization.

In various embodiments of the antenna structure, the first plurality of receive antennas is arranged orthogonal to the first plurality of transmit antennas, and the second plurality of receive antennas is arranged orthogonal to the second plurality of transmit antennas. In various embodiments, the first axis corresponds to an azimuth dimension and the second axis corresponds to an elevation dimension, and wherein the second scan rate is greater than the first scan rate. In various embodiments, the first axis corresponds to an elevation dimension and the second axis corresponds to an azimuth dimension, and wherein the second scan rate is lesser than the first scan rate.

In various embodiments, the antenna structure further includes a transceiver coupled to the receive array and the transmit array, the transceiver configured to generate a transmission signal for transmission via the transmit array and to process a received return signal received via the receive array; and an antenna controller coupled to the transceiver and configured to adjust the transmit array to scan angles in a first direction and adjust the receive array to scan angles in a second direction orthogonal to the first direction.

In various embodiments, the antenna structure further includes a first feed network is configured to couple between the transceiver and the first plurality of transmit antennas; and a second feed network is configured to couple between the transceiver and the second plurality of transmit antennas, wherein the second feed network is independent of the first feed network.

In various embodiments, the antenna structure further includes a first combination network configured to couple between the transceiver and the first plurality of receive antennas; and a second combination network configured to couple between the transceiver and the second plurality of receive antennas, wherein the second combination network is independent of the first combination network.

In accordance with various embodiments, a radar system for two-dimensional scanning is disclosed. The radar system includes an antenna module configured to radiate a transmission signal with an analog beamforming antenna in a plurality of directions using one or more phase control elements and to generate radar data capturing a surrounding environment from a received return signal, wherein the antenna module includes: a transmit array arranged along a first axis and configured to scan a field of view along the first axis at a first scan rate with radio frequency (RF) beams in a first polarization, and a receive array arranged along a second axis orthogonal to the first axis and configured to receive return RF beams in the first polarization to scan the field of view along the second axis at a second scan rate different from the first scan rate; and a perception module configured to detect and identify a target in the surrounding environment from the radar data.

In various embodiments of the radar system, the receive array includes a first plurality of receive antennas arranged along the second axis and configured to receive return RF beams in the first polarization to scan the field of view along the second axis at the second scan rate; and a second plurality of receive antennas arranged along the first axis and configured to receive return RF beams in a second polarization orthogonal to the first polarization to scan the field of view along the first axis at the first scan rate. In various embodiments of the radar system, the transmit array includes a first plurality of transmit antennas arranged along the first axis and configured to scan the field of view along the first axis at the first scan rate with the RF beams in the first polarization; and a second plurality of transmit antennas arranged along the second axis and configured to scan the field of view along the second axis at the second scan rate with the RF beams in the second polarization.

In various embodiments, the first axis corresponds to an azimuth dimension and the second axis corresponds to an elevation dimension, and wherein the second scan rate is greater than the first scan rate. In various embodiments, the first axis corresponds to an elevation dimension and the second axis corresponds to an azimuth dimension, and wherein the second scan rate is lesser than the first scan rate.

In various embodiments, the radar system further includes a first feed network coupled between the transceiver and the first plurality of transmit antennas and a second feed network coupled between the transceiver and the second plurality of transmit antennas, wherein the second feed network is independent of the first feed network. In various embodiments, the radar system further includes a first combination network coupled between the transceiver and the first plurality of receive antennas and a second combination network coupled between the transceiver and the second plurality of receive antennas, wherein the second combination network is independent of the first combination network.

As described throughout the disclosure, a radar system can be referred to as antenna system or antenna structure, in accordance with various embodiments. In various embodiments, the radar system, antenna system or antenna can be integrated or include in a vehicle license plate frame or a license plate frame.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. An antenna system, comprising:
a transmit array arranged along a first axis and configured to scan a field of view along the first axis at a first scan rate with radio frequency (RF) beams in a first polarization, wherein the transmit array comprises:
   a first plurality of transmit antennas arranged along the first axis and configured to scan the field of view along the first axis at the first scan rate with the RF beams in the first polarization; and
   a second plurality of transmit antennas arranged along a second axis and configured to scan the field of view along the second axis at a second scan rate with the RF beams in a second polarization orthogonal to the first polarization;
a receive array arranged along the second axis orthogonal to the first axis and configured to receive return RF beams in the first polarization to scan the field of view along the second axis at the second scan rate different from the first scan rate, wherein the receive array comprises:
   a first plurality of receive antennas arranged along the second axis and configured to receive the return RF beams in the first polarization to scan the field of view along the second axis at the second scan rate; and
   a second plurality of receive antennas arranged along the first axis and configured to receive return RF beams in the second polarization to scan the field of view along the first axis at the first scan rate;
a transceiver coupled to the receive array and the transmit array, the transceiver configured to generate a transmission signal for transmission via the transmit array and to process a received return signal received via the receive array; and
an antenna controller coupled to the transceiver and configured to adjust the transmit array to scan angles in a first direction and adjust the receive array to scan angles in a second direction orthogonal to the first direction.

2. The antenna system of claim 1, wherein the first axis corresponds to an azimuth dimension and the second axis corresponds to an elevation dimension, and wherein the second scan rate is greater than the first scan rate.

3. The antenna system of claim 1, wherein the first axis corresponds to an elevation dimension and the second axis corresponds to an azimuth dimension, and wherein the second scan rate is lesser than the first scan rate.

4. The antenna system of claim 1, further comprising:
a first feed network coupled between the transceiver and the first plurality of transmit antennas and a second feed network coupled between the transceiver and the second plurality of transmit antennas, wherein the second feed network is independent of the first feed network.

5. The antenna system of claim 1, further comprising:
a first combination network coupled between the transceiver and the first plurality of receive antennas and a second combination network coupled between the transceiver and the second plurality of receive antennas, wherein the second combination network is independent of the first combination network.

6. A method of operating an antenna structure, comprising:

scanning, via a transmit array, a field of view along a first axis of the antenna structure at a first scan rate with radio frequency (RF) beams in a first polarization, wherein the transmit array comprises:

a first plurality of transmit antennas arranged along the first axis and configured to scan the field of view along the first axis at the first scan rate with the RF beams in the first polarization; and a second plurality of transmit antennas arranged along a second axis and configured to scan the field of view along the second axis at a second scan rate with the RF beams in a second polarization;

receiving, via a receive array, return RF beams in the first polarization to scan the field of view along the second axis of the antenna structure orthogonal to the first axis at the second scan rate different from the first scan rate, wherein the receive array comprises:

a first plurality of receive antennas arranged along the second axis and configured to receive the return RF beams in the first polarization to scan the field of view along the second axis at the second scan rate; and a second plurality of receive antennas arranged along the first axis and configured to receive return RF beams in the second polarization orthogonal to the first polarization to scan the field of view along the first axis at the first scan rate;

generating, via a transceiver coupled to the receive array and the transmit array, a transmission signal for transmission via the transmit array;

processing, via the transceiver, a return signal received via the receive array;

adjusting, via an antenna controller coupled to the transceiver, the transmit array to scan angles in a first direction; and adjusting, via the antenna controller, the receive array to scan angles in a second direction orthogonal to the first direction.

7. The method of claim 6, wherein the first plurality of receive antennas IS arranged orthogonal to the first plurality of transmit antennas, and the second plurality of receive antennas is arranged orthogonal to the second plurality of transmit antennas.

8. The method of claim 6, wherein the first axis corresponds to an azimuth dimension and the second axis corresponds to an elevation dimension, and wherein the second scan rate is greater than the first scan rate.

9. The method of claim 6, wherein the first axis corresponds to an elevation dimension and the second axis corresponds to an azimuth dimension, and wherein the second scan rate is lesser than the first scan rate.

10. The method of claim 6, wherein the antenna structure further comprises:

a first feed network coupled between the transceiver and the first plurality of transmit antennas; and a second feed network coupled between the transceiver and the second plurality of transmit antennas, wherein the second feed network is independent of the first feed network.

11. The method of claim 6, wherein the antenna structure further comprises:

a first combination network coupled between the transceiver and the first plurality of receive antennas; and a second combination network coupled between the transceiver and the second plurality of receive antennas, wherein the second combination network is independent of the first combination network.

12. An antenna structure, comprising:

A transmit array arranged along a first axis and configured to scan a field of view along the first axis at a first scan rate with radio frequency (RF) beams in a first polarization, wherein the transmit array comprises a first plurality of transmit antennas arranged along the first axis and configured to scan the field of view along the first axis at the first scan rate with the RF beams in the first polarization and a second plurality of transmit antennas arranged along a second axis and configured to scan the field of view along the second axis at a second scan rate with the RF beams in a second polarization; and a receive array arranged along the second axis orthogonal to the first axis and configured to receive the return RF beams in the first polarization to scan the field of view along the second axis at the second scan rate different from the first scan rate, wherein the receive array comprises a first plurality of receive antennas arranged along the second axis and configured to receive return RF beams in the first polarization to scan the field of view along the second axis at the second scan rate the first polarization and a second plurality of receive antennas arranged along the first axis and configured to receive return RF beams in the second polarization orthogonal to the first polarization to scan the field of view along the first axis at the first scan rate.

13. The antenna structure of claim 12, wherein the first plurality of receive antennas is arranged orthogonal to the first plurality of transmit antennas, and the second plurality of receive antennas is arranged orthogonal to the second plurality of transmit antennas.

14. The antenna structure of claim 12, wherein the first axis corresponds to an azimuth dimension and the second axis corresponds to an elevation dimension, and wherein the second scan rate is greater than the first scan rate.

15. The antenna structure of claim 12, wherein the first axis corresponds to an elevation dimension and the second axis corresponds to an azimuth dimension, and wherein the second scan rate is lesser than the first scan rate.

16. The antenna structure of claim 12, further comprising:

a transceiver coupled to the receive array and the transmit array, the transceiver configured to generate a transmission signal for transmission via the transmit array and to process a received return signal received via the receive array; and an antenna controller coupled to the transceiver and configured to adjust the transmit array to scan angles in a first direction and adjust the receive array to scan angles in a second direction orthogonal to the first direction.

17. The antenna structure of claim 16, further comprising:

a first feed network coupled between the transceiver and the first plurality of transmit antennas; and a second feed network coupled between the transceiver and the second plurality of transmit antennas, wherein the second feed network is independent of the first feed network.

18. The antenna structure of claim 16, further comprising:

a first combination network coupled between the transceiver and the first plurality of receive antennas; and a second combination network coupled between the transceiver and the second plurality of receive antennas, wherein the second combination network is independent of the first combination network.

* * * * *